United States Patent [19]
Furukawa et al.

[11] Patent Number: 6,160,780
[45] Date of Patent: Dec. 12, 2000

[54] DISC CLAMPER AND DISC DRIVE PROVIDED WITH THE DISC CLAMPER

[75] Inventors: Ken'ichi Furukawa, Kawasaki; Kouji Teranishi, Atsugi; Satoru Manabe, Chofu, all of Japan

[73] Assignee: Mitsumi Electric Co., Japan

[21] Appl. No.: 09/052,562

[22] Filed: Mar. 31, 1998

[30] Foreign Application Priority Data

Apr. 2, 1997 [JP] Japan ................................ 9-099800

[51] Int. Cl.$^7$ ................................................ G11B 17/02
[52] U.S. Cl. ...................... 369/75.2; 369/270; 360/99.12
[58] Field of Search ............................... 369/75.2, 270, 369/277; 360/99.08, 99.12

[56] References Cited

U.S. PATENT DOCUMENTS

| | | | |
|---|---|---|---|
| 4,654,840 | 3/1987 | Takahashi | 369/75.2 |
| 4,689,782 | 8/1987 | Tsuchiya et al. | 369/279 |
| 4,829,510 | 5/1989 | Takahashi | 369/290 |
| 4,841,518 | 6/1989 | Nozu et al. | 369/270 |
| 5,243,481 | 9/1993 | Dunckley et al. | 360/99.08 |
| 5,583,717 | 12/1996 | Nakata et al. | 360/99.06 |
| 5,610,900 | 3/1997 | Yamashita et al. | 369/271 |
| 5,907,533 | 5/1999 | Choi | 369/271 |

FOREIGN PATENT DOCUMENTS 2316219  2/1998  United Kingdom .

Primary Examiner—David L. Ometz
Assistant Examiner—Angel Castro
Attorney, Agent, or Firm—Patents+TMS, P.C.

[57] ABSTRACT

An improved disc clamper and a disc drive equipped with the disc clamper is disclosed. The disc clamper is used in a disc drive for carrying out playing back or playing back and recording of a disc which is rotated by means of a turntable movable between a raised position and a lowered position. The disc clamper is supported rotatably and movably in up and down direction by a support member with an opening provided above the turntable so as to hold the disc between the clamper and the turntable moved to the raised position. The disc clamper comprises a disc clamper main body including a cylindrical part, which has a substantially cylindrical shape and a diameter almost equal to the diameter of the turntable, to be inserted into the opening in the support member, and a flange part provided integrally with the upper circumference of the cylindrical part so as to be supported on the upper surface of the support member, an attraction means provided in the disc clamper main body to be attracted to the turntable, and a plurality of disc pressing protrusions projecting outward in the radial direction from the lower circumference of the cylindrical part of the disc clamper main body. This disc clamper is light and has a simple structure for easy assembling, and makes it possible to press the top surface of the disc with an effectively large area.

8 Claims, 20 Drawing Sheets

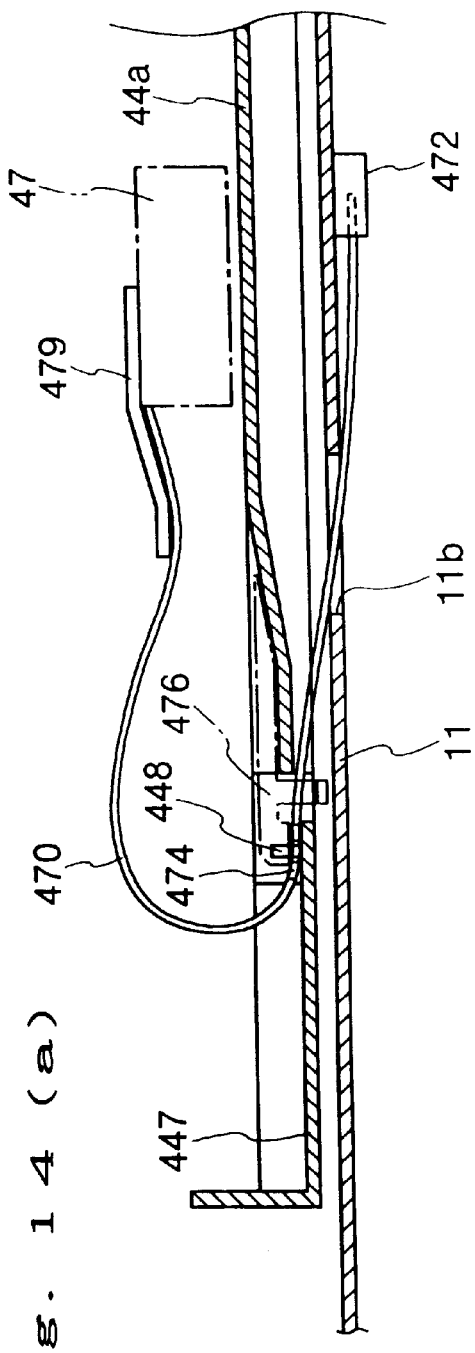
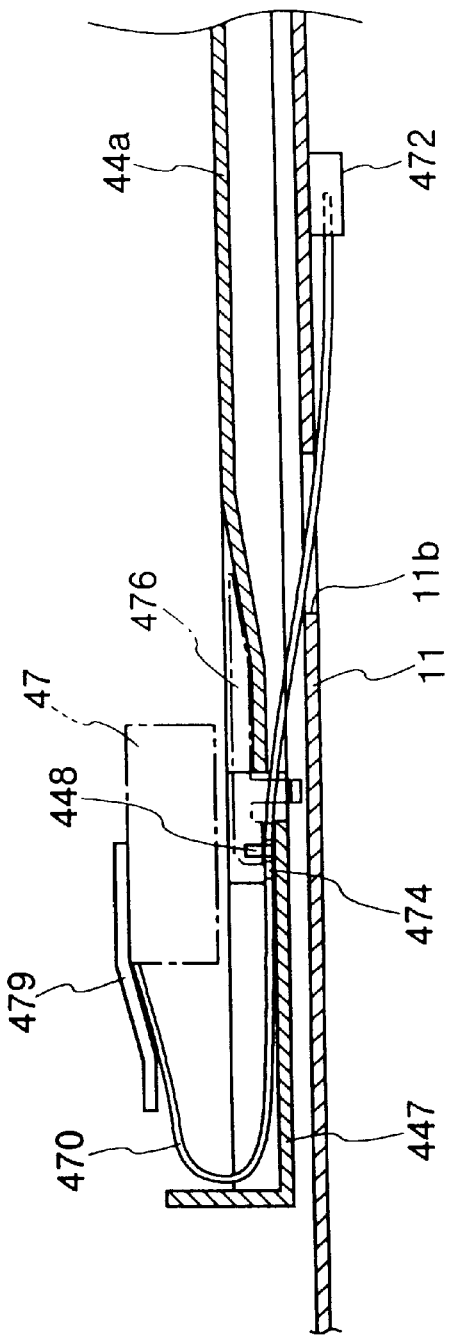
Fig. 14(a)
Fig. 14(b)

DISC CLAMPER AND DISC DRIVE PROVIDED WITH THE DISC CLAMPER

BACKGROUND OF THE INVENTION

1. Field of the Invention

This invention relates to a disc clamper for holding a disc between a turntable and the disc clamper in a disc drive and a disc drive provided with the disc clamper.

2. Description of the Prior Art

In a disc drive such as a CD-ROM drive or a CD-R drive, for example, increase in the rotational speed of an optical disc has been attempted in recent years, and high speeds such as the 4 times speed, 8 times speed, and 12 times speed have actually been achieved.

In such a disc drive, when playing back or playing back and recording of an optical disc is carried out, the disc is placed on a turntable which is raised from down below the disc, and then the disc is rotated by being held between the turntable and a disc clamper which is provided rotatably facing the top side of the turntable.

Conventionally, in these disc drives, a disc clamper having a diameter greater than the diameter of the turntable is used in order to obtain a stabilized rotation of the disc surface by suppressing the flutter of the disc during the rotation.

However, when the rotational speed of the disc becomes high as mentioned above, the use of a disc clamper with a large diameter will cause vibrations of the disc drive owing to a slight decentering of the disc clamper and the like. Moreover, in playing back the disc, it is usual to change the rotational speed of the disc according as the playback of the inner tracks and the playback of the outer tracks of the disc. In this case, when the diameter of the disc clamper is large and its weight is large accordingly, a problem arises in that a smooth control of the rotational speed is difficult due to its high inertia.

For this reason, in such a high speed disc drive, it is said that it is desirable to set the diameter of the disc clamper to be equal to or smaller than the diameter of the turntable. It is to be noted in this connection that the diameter of the turntable is restricted to a specified value owing to the relationship to the size of the recording surface of the disc determined by the standard.

In the meantime, there still exists a request to depress the disc from above by the use of a clamper with a diameter larger than that of the turntable in order to obtain a stabilized rotation of the disc surface by suppressing the flutter during the rotation.

SUMMARY OF THE INVENTION

The present invention has been made in view of the request described above. Accordingly, it is an object of the present invention to provide a disc clamper which makes it possible to obtain a stabilized disc rotation without increasing the diameter of the disc clamper while maintaining its weight light, and a disc drive employing such a disc clamper.

In order to achieve the above object, the present invention is directed to a disc clamper which is used in a disc drive for carrying out playing back or playing back and recording of a disc which is rotated by means of a turntable movable between a raised position and a lowered position. The disc clamper supported is rotatable and movable in up and down directions by a support member with an opening provided above the turntable so as to hold the disc between the clamper and the turntable moved to the raised position. The disc clamper comprises a disc clamper main body including a cylindrical part, which has a substantially cylindrical shape and a diameter almost equal to the diameter of the turntable, to be inserted into the opening in the support member, and a flange part provided integrally with the upper circumference of the cylindrical part so as to be supported on the upper surface of the support member, an attraction means provided in the disc clamper main body to be attracted to the turntable, and a plurality of disc pressing protrusions projecting outward in the radial direction from the lower circumference of the cylindrical part of the disc clamper main body.

According to a disc clamper with the above construction, it is possible to press the top surface of the disc with an effectively large area despite being a disc clamper of a small diameter and light weight, thereby enabling to obtain a stabilized disc rotation by suppressing the flutter of the disc.

In addition, the manufacture of the disc clamper is facilitated because the disc clamper main body can be formed integrally with injection molding, and its assembly is also facilitated because the number of part items constituting the disc clamper is only two.

In this case, it is preferred that the plurality of disc pressing protrusions are composed of three protrusions formed with equal intervals in the circumferential direction. Moreover, it is also preferred that openings are formed in the flange part of the disc clamper main body at positions corresponding to the disc pressing protrusions, by which integral formation of the disc clamper is made possible.

Further, the present invention is also directed to a disc drive which comprises a disc drive main body provided with a turntable constructed to be movable between a raised position and a lowered position for rotationally driving a disc, a disc tray, with a disc placing surface on which the disc is to be placed, the disc tray being movable between a disc play back position and a disc ejecting position relative to the disc drive main body, a support member provided above the turntable in the disc drive main body with a spacing from the turntable, and a disc clamper supported rotatably and vertically movably by the support member, for holding the disc, which is brought to the disc playback position by the disc tray, between the turntable and the disc clamper, wherein the disc clamper comprises a cylindrical part of substantially cylindrical shape with a diameter almost equal to the diameter of the turntable, the cylindrical part is inserted into an openings in the support member, and a flange part integrally formed on the upper circumference of the cylindrical part so as to be supported on the upper surface of the support member, and an attraction means provided in the disc clamper main body and adapted to be attracted by the turntable, wherein a plurality of disc pressing protrusions are formed integrally on the lower circumference of the cylindrical part of the disc clamper at equal intervals in the circumferential direction projecting outward in the radial direction.

Other objects, structures and advantages of the present invention will be apparent when the following description of the preferred embodiments are considered taken in conjunction with the accompanying drawings.

BRIEF DESCRIPTION OF THE DRAWINGS

FIGS. 14(a) and 14(b) are explanatory drawings which respectively show changes in a form of the flexible printed circuit according to the movement of the optical pick-up;

DETAILED DESCRIPTION OF THE PREFERRED EMBODIMENTS

Hereinafter, with reference to the accompanying drawings, a description is made with regard to an embodiment of a disc clamper and a disc drive equipped with the disc clamper according to the present invention.

Figure 1:
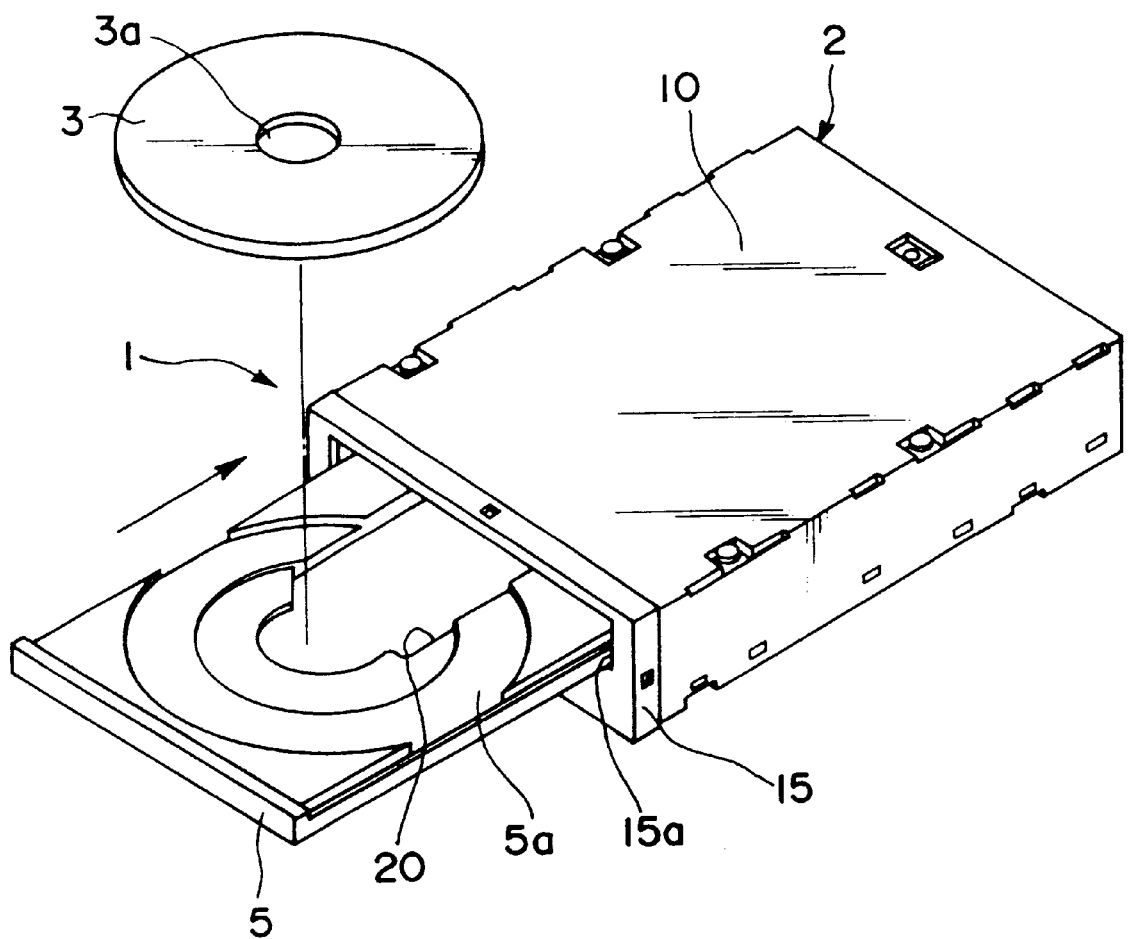
FIG. 1 is a perspective view of a disc clamper and a disc drive provided with the disc clamper according to the present invention.
Figure 2:
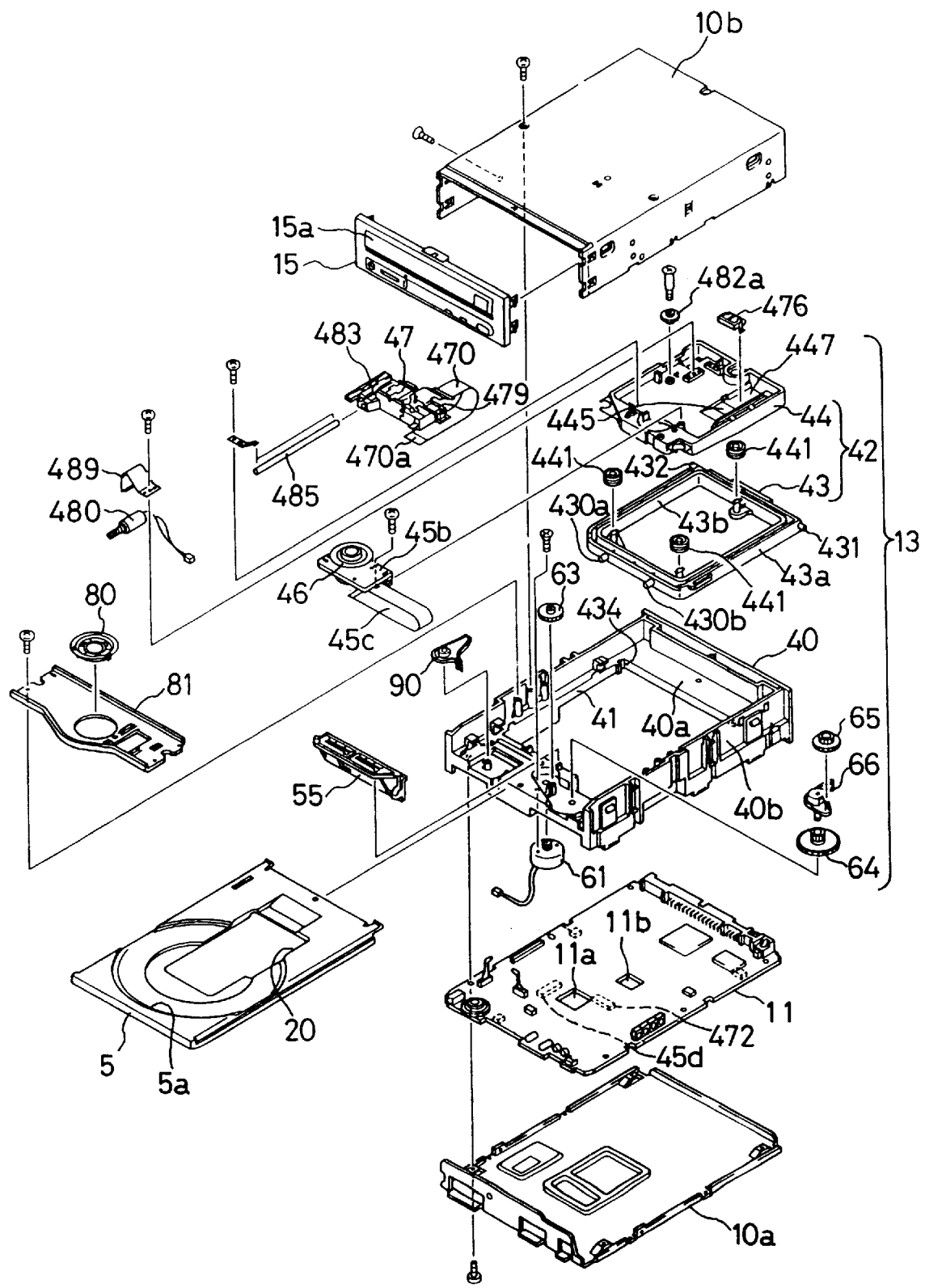
FIG. 2 is an exploded view of the disc drive shown in FIG. 1.
Figure 3:
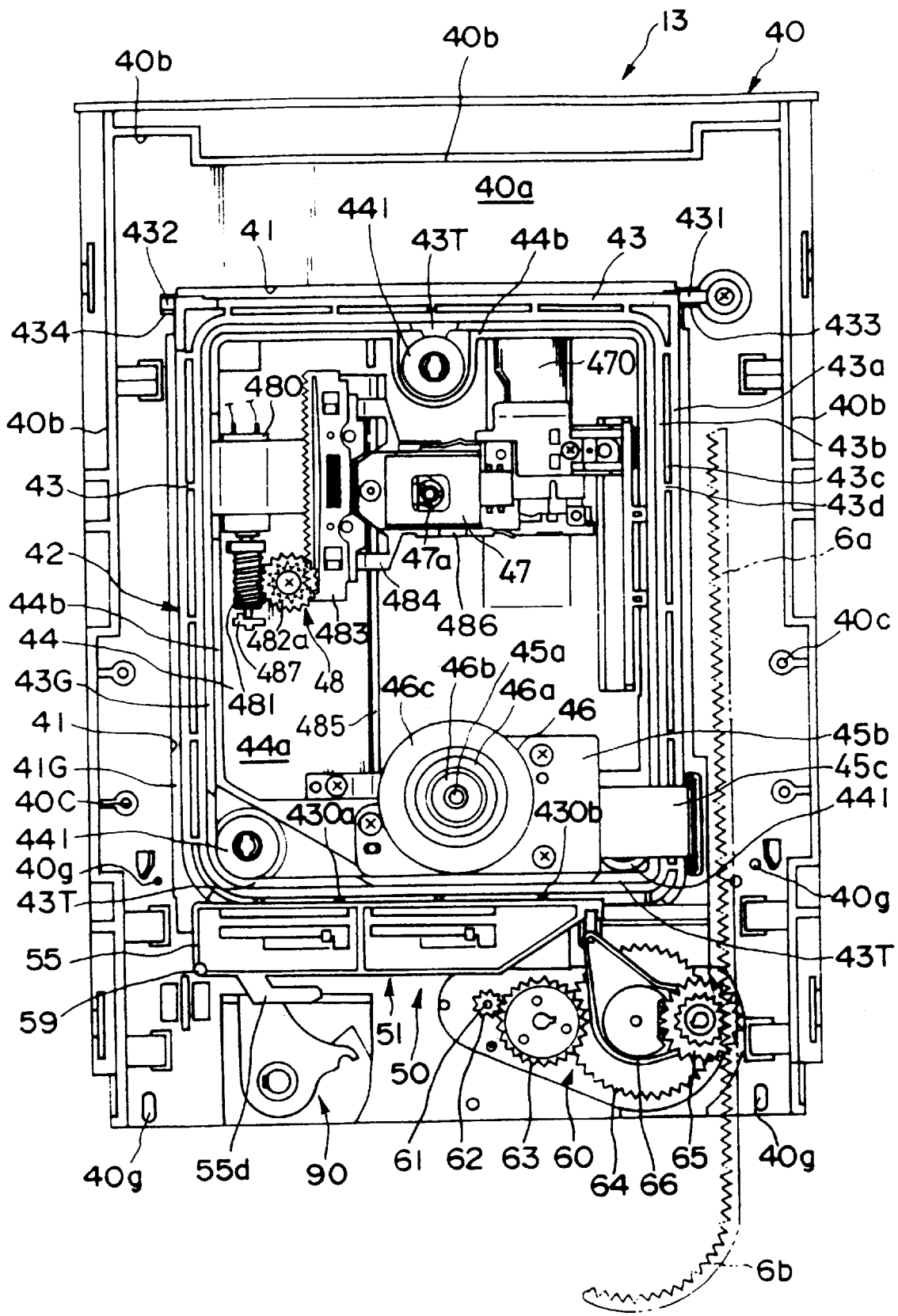
FIG. 3 is a planar view of a main body of the disc drive shown in FIG. 1, in which a mechanism unit is shown in a lowered position.
Figure 4:
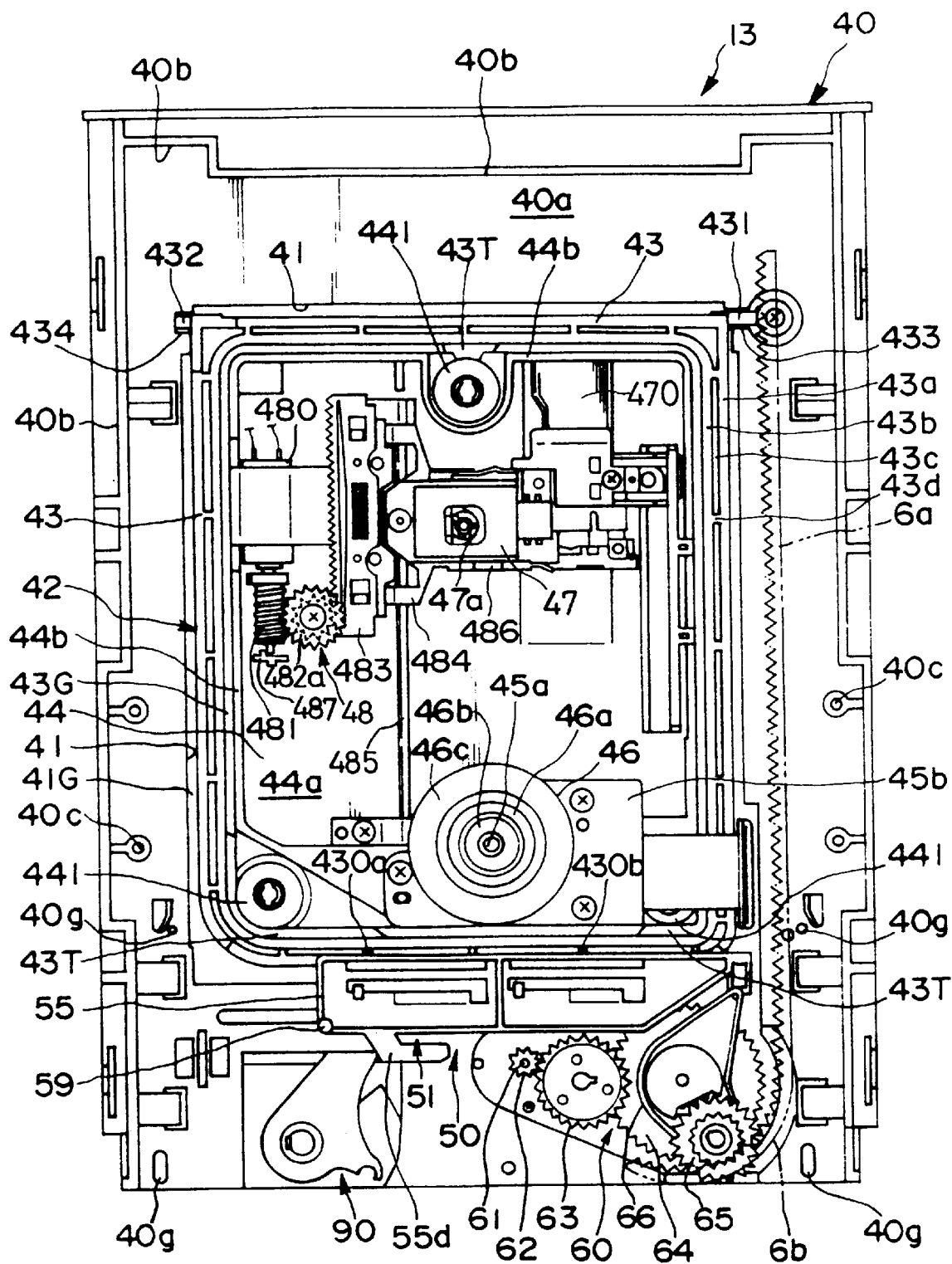
FIG. 4 is another planar view of the main body of the disc drive shown in FIG. 1, in which the mechanism unit is shown in a raised position.

FIG. 1 is a perspective view which shows an external appearance of a disc drive to which a clamper according to the present invention is applied, FIG. 2 is an exploded perspective view of the disc drive, FIG. 3 is a planar view of a main body of the disc drive from which a casing is removed, which shows a state in which a mechanism unit is in a lowered position (lower position), and FIG. 4 is another planar view of the main body, which shows a state in which the mechanism unit is in a raised position (upper position).

As shown in FIG. 1, The disc drive 1 is configured into a CD-ROM drive, CD-R drive or the like for carrying out playing back or recording and playing back of an optical disc 3. The disc drive 1 is roughly constructed from a main body 2 and a disc tray 5 which is movable in the forward and backward direction (horizontal direction) with respect to the main body 2 for transporting the optical disc 3.

As shown in FIG. 2, the main body 2 is roughly constructed from a printed circuit board 11, a mechanism assembly 13 provided on the printed circuit board 11 and a casing which houses the printed circuit board 11 and the mechanism assembly 13. The casing 10 is comprised of a bottom plate 10a provided below the printed circuit board 11 and a roughly box-shaped upper case 10b whose front and bottom sides are opened so as to surround the mechanism assembly 13. The bottom plate 10a and upper case 10b are formed of thin metal plates, and they are attached to the mechanism assembly 13 by means of screws or the like. Further, at the front portion of the casing 10, there is mounted a front panel 15 having an opening 15a.

As shown in FIG. 2, the printed circuit board 11 is provided with an interface connector for connection with a personal computer, various IC's such as a microprocessor, memories and motor drivers and the like, and various electrical parts such as resistors, capacitors and switches and the like. With these elements, not only the optical pick-up but also a spindle motor, a loading motor and a sled motor described hereinbelow are electronically controlled.

As shown in FIGS. 2 to 4, the mechanism assembly 13 housed in the casing 10 is provided with a chassis 40 which is preferably constructed from a hard resin. The chassis 40 is constructed from a bottom portion 40a having a roughly rectangular-shaped aperture 41 and a U-shaped wall portion 40b which stands erect along the left, right and back edge portions of the bottom portion 40a.

In this way, no wall portion is formed in the front of the chassis 40 such that the front of the chassis 40 is open. Further, when the mechanism assembly 13 is assembled into the casing 10, the open front portion of the chassis 40 is aligned with the opening 15a of the front panel 15 attached to the casing 10 so that the disc tray 5 can be moved into and out of the main body 2 through the opening 15a.

As shown in FIGS. 1 and 2, the disc tray 5 is provided with a shallow concave disc supporting portion 5a. The optical disc 3 is placed in the disc supporting portion 5a of the dick tray 5, and then transported to a disc loaded position (disc playback position) under the condition that the optical disc 3 is placed in a prescribed position. Further, in the disc tray 5, there is formed a substantially rectangular shaped opening which extends from the roughly central portion of the disc supporting portion 5a toward the rear portion thereof such that a turntable described hereinbelow can be raised through this opening and an optical scanning can be carried out by the optical pick-up through this opening 20.

Figure 5:
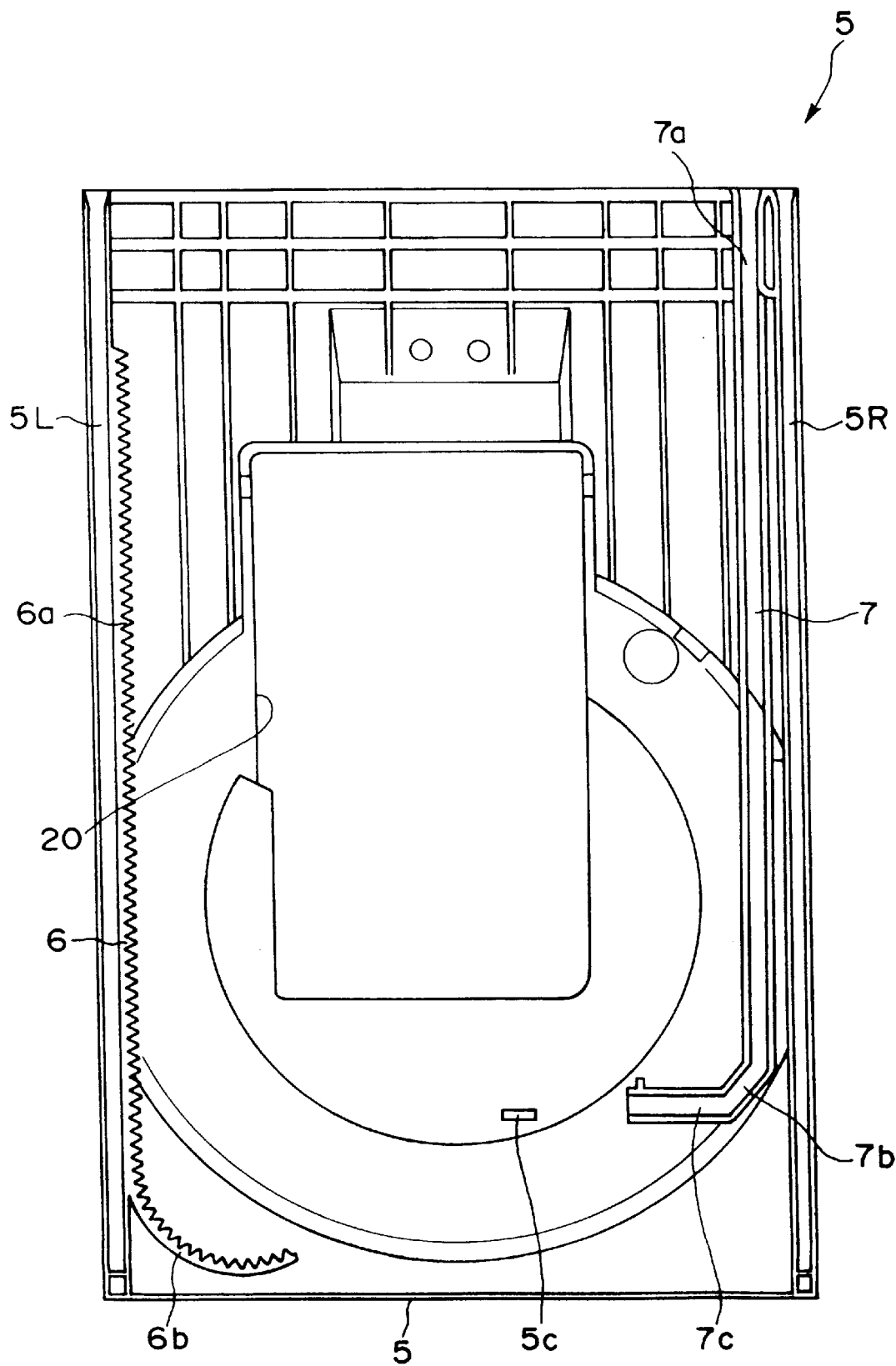
FIG. 5 is a bottom view which shows the structure of the underside of a disc tray of the disc drive shown in FIG. 1.

As shown in FIG. 5, on the left and right portions of the underside surface of the disc tray 5, there are formed guide grooves 5L, 5R so as to extend in a longitudinal direction of the disc tray 5. These guide grooves 5L and 5R are adapted to slidably engage with protruding guide members 40g (see FIGS. 3 and 4) formed on the left and right side portions of the bottom portion 40a of the chassis 40.

Further, the underside surface of the disc tray 5 is provided with a rack gear 6 which includes a first rack 6a which extends in a straight line in the forward and backward direction along the guide groove 5L and a roughly 90 degree arc-shaped second rack 6b which is formed at the front end portion (the front side of the disc tray 5, as shown in the lower portion of FIG. 5) of the first rack 6a so as to be continuous therewith.

Furthermore, as shown in FIG. 5, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree angle with respect to the first movement restricting groove 7a.

In this regard, it is to be noted that a rib (protrusion) indicated by the reference numeral 5c in the drawing is a member that is adapted to engage with a disc tray locking portion 55d formed in a cam member 55 (described below) for restricting the horizontal movement (forward and backward direction) of the disc tray 5.

Further, as shown in FIGS. 2 to 4, the chassis 40 is provided with a mechanism unit 42 equipped with a turntable 46 for rotating the optical disc 3 and an optical pick-up 47 for playing back or recording and playing back the optical disc 3 and others.

The mechanism unit 42 is arranged inside a roughly rectangular-shaped opening 41 formed in the bottom portion 40a of the chassis 40, with the rear portion of the mechanism unit 42 being supported in a manner that makes it possible for such rear portion to pivot with respect to the chassis 40 in order to enable the front portion of the mechanism unit 42 to be displaced between a raised position (upper position; FIG. 4) in which the optical disc 3 is supported on the turntable 46 and a lowered position (lower position; FIG. 3) which is lower than the raised position.

In particular, as shown in FIGS. 2 to 4, the mechanism unit 42 includes a base frame 43 constructed preferably from a hard resin, and a support member (support plate) 44 which is supported on the base frame 43 via elastic members (insulators) 441.

The base frame 43 is formed so as to have a roughly rectangular shape which includes a front portion and a rear portion. In more detail, the base frame 43 comprises a substantially rectangular outer frame 43a and a substantially rectangular inner frame 43b arranged inside the outer frame 43a. The inner frame 43b is one size smaller than the outer frame 43a so as to define a space therearound and its corner portions are formed into an arched shape, respectively. Further, between the outer and inner frames 43a, 43b, there is formed a horizontal connecting portion 43c which connects these frames integrally at a position roughly at the middle of their height. Furthermore, a plurality of reinforcing vertical ribs 43d are integrally formed on the connecting portion 43c through a predetermined spacing so as to connect the outer and inner frames integrally. As a result, the base frame 43 is constructed into a so-called rudder frame in which the reinforcing vertical ribs 43d are formed on the horizontal connecting portion 43c through a prescribed spacing around the inner frame 43b.

This base frame 43 is formed by injection molding. In this case, if the base frame 43 is formed from a usual mold body made of a hard resin and having a certain thickness, there is a case that deformation would occur when it is cooled after injection molding. However, if the base frame 43 is formed in the form of the rudder frame described above, it is possible to avoid such deformation from occurring and this means that it becomes possible to provide a light base frame having a high strength by injection molding.

Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner wall portions of the chassis 40 defining the opening 41. By supporting the rear portion of the mechanism unit 42 with the axles 431, 432 in this way, the front portion of the mechanism unit 42 is able to move with respect to the chassis 40 between the lowered position shown in FIG. 3 and the raised position shown in FIG. 4 when the mechanism unit 42 (base frame 43) is rotated around the axles 431, 432.

Figure 15:
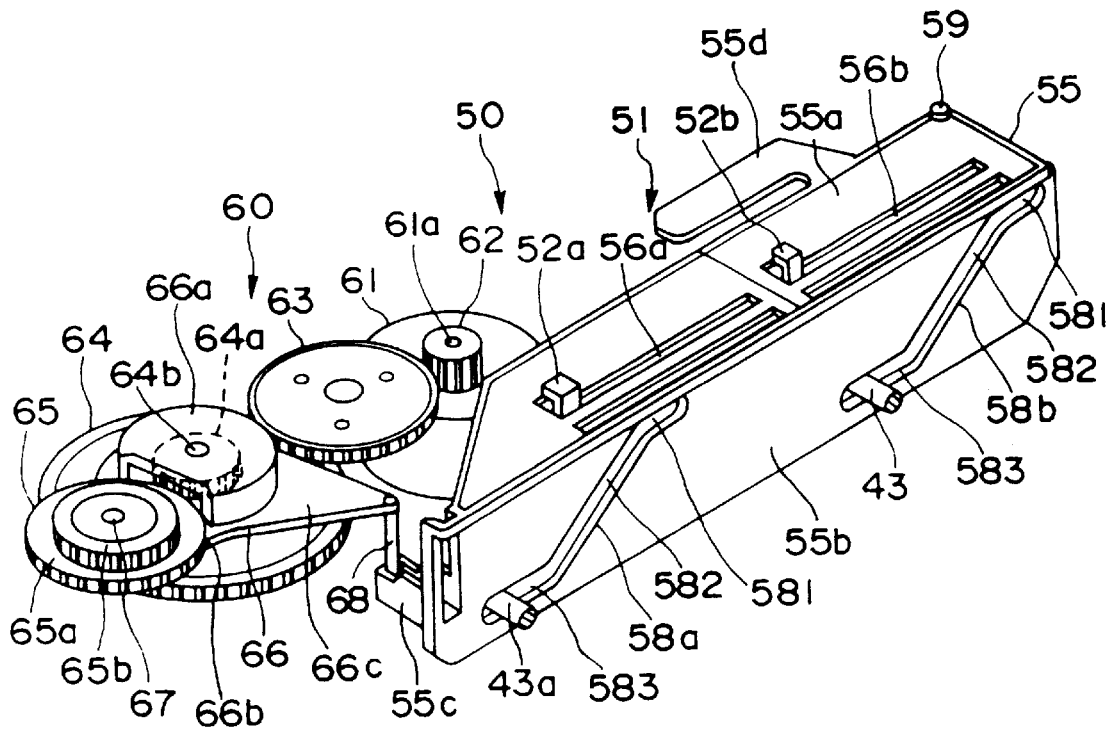
FIG. 15 is a perspective view which shows the structure of a cam mechanism used in the optical disc drive shown in FIG. 1, in which the cam member is shown in a first position.
Figure 16:
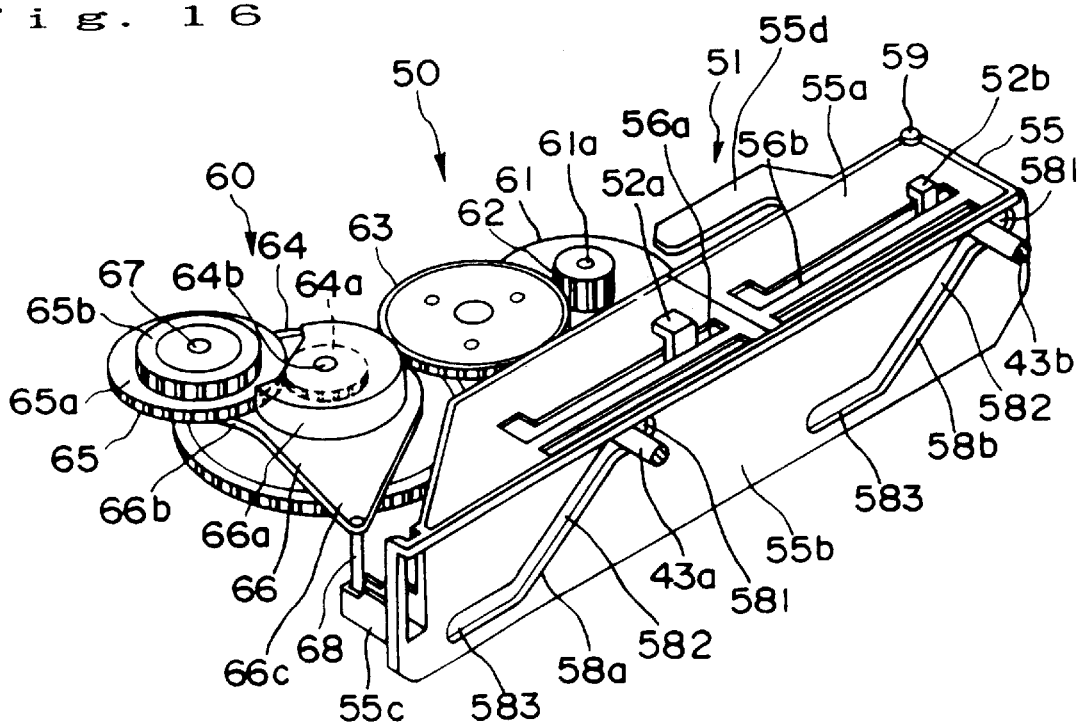
FIG. 16 is a perspective view which shows the structure of the cam mechanism used in the optical disc drive shown in FIG. 1, in which the cam member is shown in a second position.

Further, a pair of protruding guide pins 430a, 430b are formed on the front of the base frame 43 (See FIGS. 15 and 16). These guide pins 430a, 430b pass through respectively a pair of guide slots (not shown in the drawings) formed in the wall portion of the front portion of the chassis 40 which defines the opening 41, and then engage respectively with cam grooves 58a, 58b of the cam member 55 of the cam mechanism 51 described hereinbelow. This enables the front portion of the base frame 43 to be guided up or down in accordance with the displacement of the cam member 55.

Taking possible deformation (thermal deformation or the like) of the chassis 40 into account, a prescribed peripheral spacing 41G is provided between the base frame 43 and wall portions of the chassis 40. Specifically, this spacing 41G is provided around roughly the entire circumference of the base frame 43. In this way, the pivotal movement of the base frame 43 is not hindered even when the chassis 40 undergoes maximum distortion.

The support member 44 is constructed from a roughly rectangular-shaped bottom portion 44a and a wall portion 44b formed around the circumference of the bottom portion 44a. The wall portion 44b is one size smaller than the inner frame 43b of the base frame 43 such that the wall portion 44b is arranged inside the inner frame 43b of the base frame 43 via a prescribed spacing 43G. The support member 44 is supported by the base frame 43 via the elastic members (insulators) 441 provided on tabs 43T formed at the left and right corner portions of the front side of the inner frame 43b of the base frame 43 and on a tab 43T at roughly the middle of the rear portion of the inner frame 43b of the base frame 43. Namely, the support member 44 is supported by the base frame 43 via the elastic members 441 provided at three points which roughly form an isosceles triangle.

Figure 6:
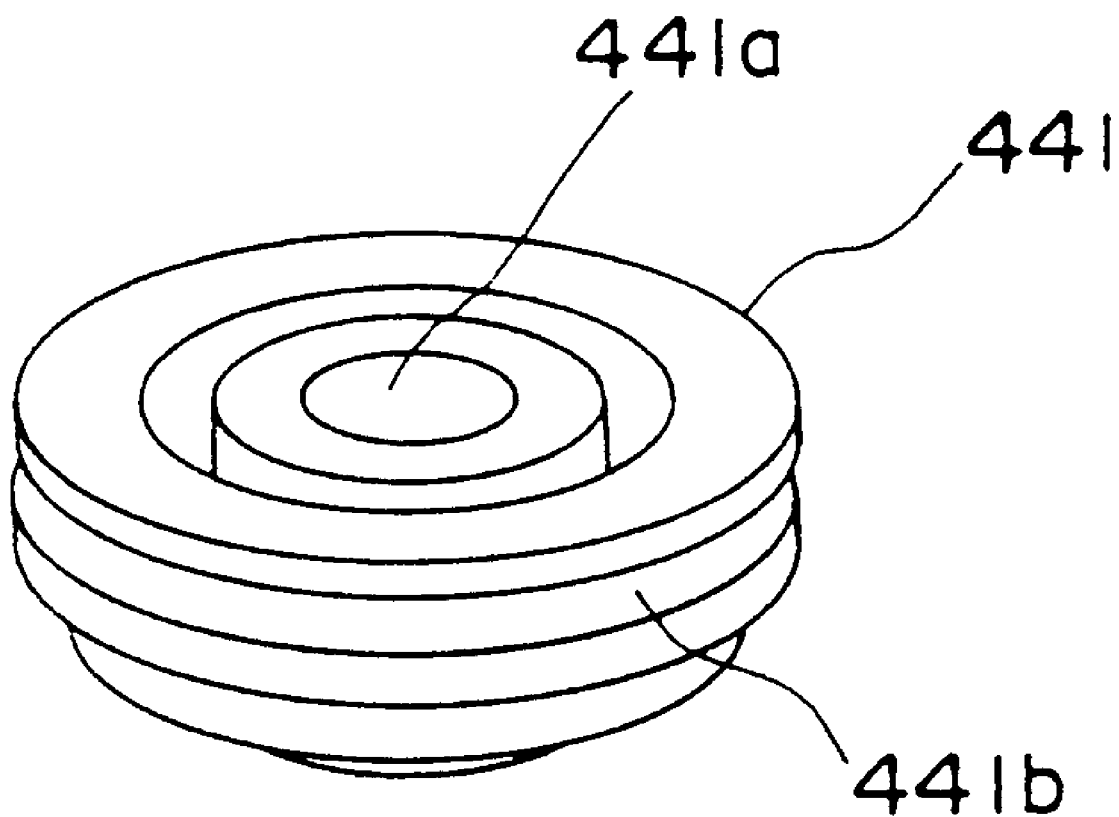
FIG. 6 is a perspective view showing the structure of an elastic member used in the disc drive shown in FIG. 1.

As shown in FIG. 6, each of the elastic members 441, which is formed from an elastic material such as rubber or the like, has a roughly cylindrical shape including a center hole 441a axially formed. On the outer circumferential surface, there is formed a circumferential groove 441b. When the elastic members 441 are arranged in place to support the support member 44 on the base frame 43, the center hole 441a of each elastic member 441 fits onto an axis provided on the respective tabs 43T of the base frame 43 and then the groove 441b fits over a respective notched portion formed at the corresponding position of the support member 44. This construction serves to prevent vibration that is generated by rotation of the spindle motor described hereinbelow from being transmitted to the chassis 40. Further, this structure also serves to prevent vibration given from the outside of the optical disc drive from being transmitted to the chassis 40.

Further, as shown in FIGS. 2 to 4, the support member 44 is provided with a spindle motor (not shown in the drawings) for rotating an optical disc 3, a turntable 46 fixed to the rotation shaft 45a of the spindle motor, and an optical pick-up 47, and an optical pick-up moving mechanism 48 for moving the optical pick-up 47 in the radial direction of the optical disc 3. The optical pick-up moving mechanism 48 is constructed in the form of a sliding feed mechanism.

The spindle motor is mounted to a motor support 45b which is made of a metal plate fixed to the support member 44. The spindle motor is capable of rotating the optical disc 3 at a high rotational speed, for example, capable of rotating the optical disc 3 at a speed of 180–3000 rpm. Further, a flat cable 45c is connected to the spindle motor for inputting and outputting control signals for the motor. As clearly shown in FIG. 2, this flat cable 45c extends through an opening 11a formed in the printed circuit board 11 and then the tip of the cable is connected to a prescribed connector 45d provided on the underside of the printed circuit board 11.

The turntable 46 is a disc-shaped member which includes a protruding ring-shaped center hub 46a formed in the center portion of the turntable 46. This center hub 46a is adapted to fit into a center hole 3a of the optical disc 3. The center hub 46a is formed so as to taper from the tip to the base in order to prevent the optical disc 3 from slipping off center when placed on the turntable 46. Further, inside the center hub 46a, there is provided a spring (not shown) which allows the center hub 46a to be moved up and down. Furthermore, a ring-shaped permanent magnet 46b for creating an attraction force on a disc clamper (described below) is provided in the turntable 46 at a position between the center hub 46a and the rotation shaft 45 of the spindle motor.

Further, a ring-shaped pad 46c is bonded to the upper part of the turntable 46 (i.e., the side used to support the optical disc 3) around the circumference of the center hub 46a. The pad 46c is made from an elastic material having a relatively high coefficient of friction so as to exhibit a function that prevents the optical disc 3 from slipping. Examples of such a material include various rubbers, soft resins or porous materials (sponges) or the like.

As described above, on the support member 44, there is provided the optical pick-up moving mechanism 48 constructed as a sliding feed mechanism. This optical pick-up moving mechanism 48 is provided for moving the optical pick-up 47 in the radial directions of the optical disc 3.

Figure 7:
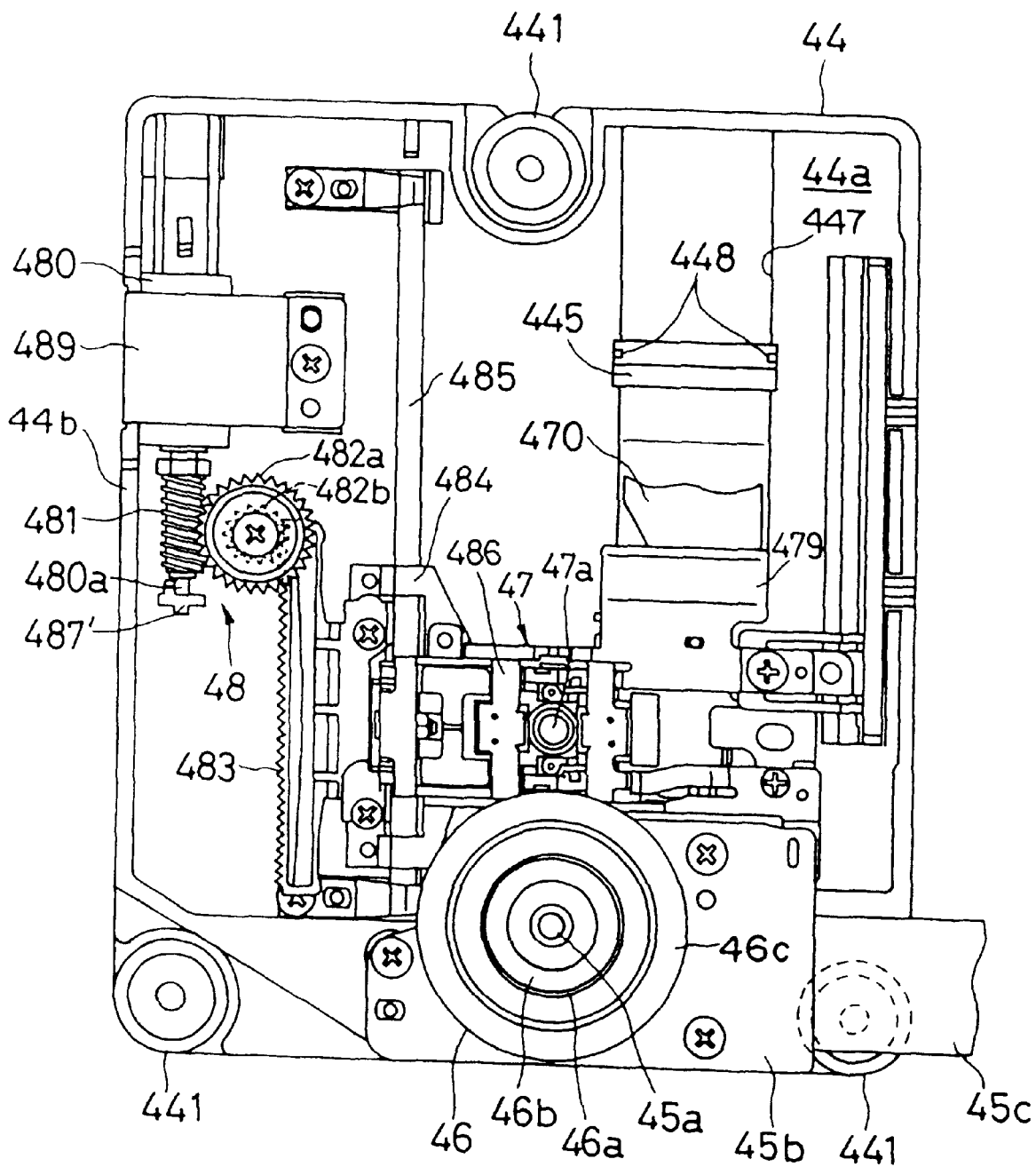
FIG. 7 is a planar view which shows a structure of the optical pick-up moving mechanism 48 of the disc drive shown in FIG. 1.

As illustrated in FIG. 7 in detail, the optical pick-up moving mechanism 48 is roughly constructed from a DC motor (sled motor) 480 capable of forward and reverse rotation, a worm (lead screw) 481 which is mounted to the rotational shaft 480a of the motor 480 and which is formed with a left-hand thread, a worm wheel 482a which meshes with the worm 481, a small-diameter pinion gear 482b which is co-axially formed with the underside surface of the worm wheel 482a, a rack gear 483 which meshes with the pinion gear 482b, a slider (driven means) 484 to which the rack gear 483 is mounted, a guide rod 485 for guiding the slider 484 and a base 486 which is integrally formed on the slider and on which the optical pick-up 47 is provided.

Each of the lead screw 481, the worm wheel 482a, the pinion gear 482b and the rack gear 483 are formed from a plastic material. In particular, as shown in FIG. 7, the rack gear 483 is formed into a structure in which the opposite ends thereof are supported by a substantially C-shaped arm so as to allow deformation toward the guide rod 485. Further, the lead screw 481 and the guide rod 485 are arranged so that their lengthwise directions are directed roughly parallel to the forward and backward direction of the optical disc drive 1.

A combination of the lead screw 481, the worm wheel 482a, the pinion gear 482b and the rack gear 483 constitutes a rotational speed reducing mechanism of the optical pick-up moving mechanism 480 (sliding feed mechanism), so that the rotational motion of the sled motor 480 is transformed into a linear motion of the optical pick-up 47 with reducing the speed. In this way, by rotating the sled motor 480 in either of a forward or reverse direction, it is possible to move the optical pick-up 47 in the radial direction of the optical disc 3.

Specifically, when the rotational shaft 480a of the sled motor 480 is rotated in the clockwise direction viewed from the tip side of the rotational shaft, the worm wheel 482a is also rotated in the clockwise direction viewed from the upper side of the rotational axis thereof through the lead screw 481 having the left-hand thread, so that the rack gear 483 is fed forward (toward the turntable). As a result, the optical pick-up 47 is moved toward the inner side of the optical disc 3 from the outer side thereof. On the other hand, when the sled motor 480 is rotated in a reverse direction, the optical pick-up 47 is moved from the inner side to the outer side. In this connection, it is to be noted that the lead screw 481 and worm wheel 482a may be formed with a right-hand thread, respectively, and in this case the motion of the pick-up 47 described above is also reversed.

Meanwhile, the rotational shaft 480a of the sled motor 480 is provided with a small play in its axial direction in order to enable smooth rotation, so that the rotational shaft 480a can be slightly displaced within the play in the axial direction thereof. Therefore, when the rotational shaft 480a of the sled motor 480 is rotated in the counterclockwise direction (which moves the optical pick-up 47 toward the outer side of the optical disc) viewed from the tip side of the rotational shaft, the rotational shaft 480a of the motor 480 is pulled and slightly displaced toward the tip end thereof within the play due to the rotation of the lead screw 481.

In this embodiment, in order to minimize the axial displacement of the rotational shaft 480a of the motor 480 within the play which is caused by the rotation of the lead screw 481, there is provided a means 487' for restricting displacement of the rotational shaft (rotational shaft displacement restricting means). This rotational shaft displacement restricting means 487' is provided in front of the tip of the rotational shaft 480a so that the tip of the rotational shaft 480a is abutted thereto to restrict further axial displacement of the rotational shaft 480a when the rotational shaft 480a is axially displaced toward the tip side thereof.

Figure 8:
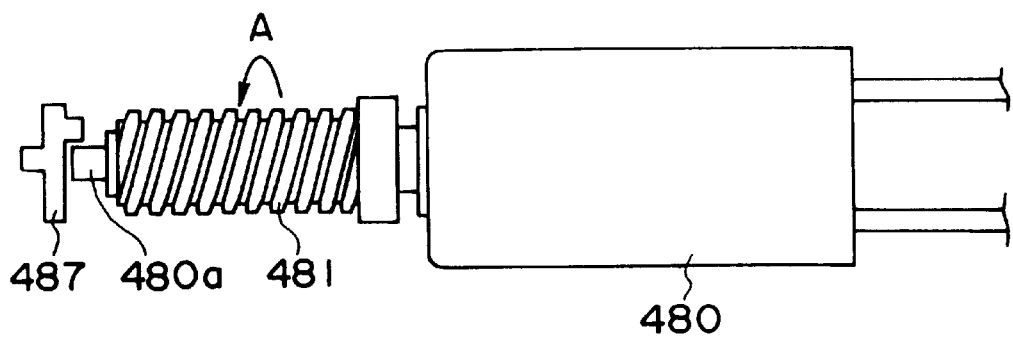
FIG. 8(a) is a planner view which shows a sled motor used in a sliding feed mechanism.
FIG. 8(b) is an enlarged view which shows the gap between the tip of the rotation axis of the sled motor and a stopper member.
Figure 8:
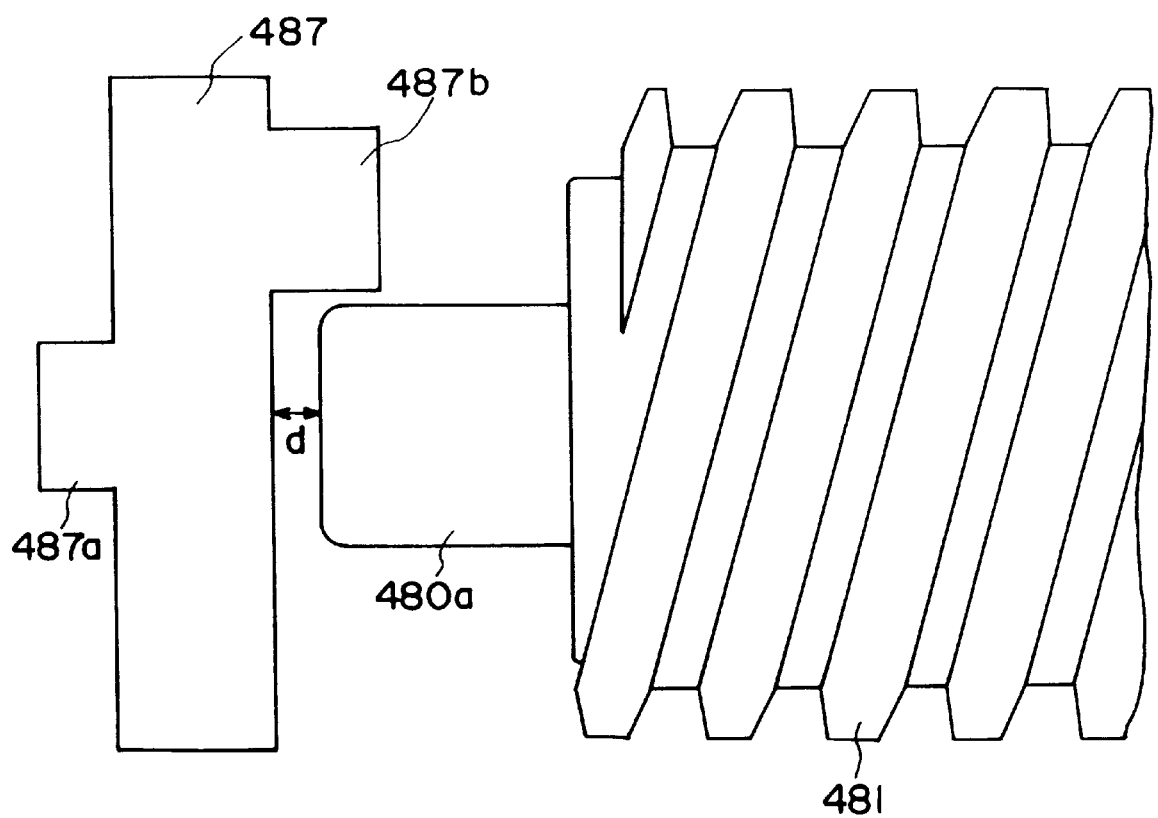

As clearly shown in FIG. 8(a) and FIG. 8(b), the rotational shaft displacement restricting means 487 is constructed from a stopper member 487' which is positioned through a prescribed distance "d" from the tip of the rotational shaft 480a under the condition that the rotational shaft 480a is sifted to the base side thereof within the play. This stopper member 487 is integrally formed with the bottom portion 44a of the support member 44 so as to protrude therefrom such that the tip of the rotational shaft 480a becomes abutted thereto when the rotational shaft 480a is displaced toward the tip end due to the rotation of the lead screw 481.

For this purpose, the prescribed distance "d" is determined to be a size less than the play of the rotational shaft 480a. For example, in the case of a small-size motor such as one used in the optical pick-up moving mechanism of the CD-R drive, the prescribed distance "d" is set to lie within the range of from 0.02 mm to 0.05 mm.

Since the stopper member 487 is pushed when the tip of the rotational shaft is abutted thereto, it is preferred that a reinforcing means is further provided to increase its strength. For example, as shown in FIG. 8(b), it is possible to form a reinforcing rib 487a on the rear surface (a surface which does not face the rotational shaft) of the stopper 487 member integrally. Further, it is also possible to form another reinforcing rib 487b on the front surface as shown in FIG. 8(b). This reinforcing rib 487b is provided at a position of the front surface where the rotational shaft 480a of the sled motor 480 is not abutted.

Figure 9:
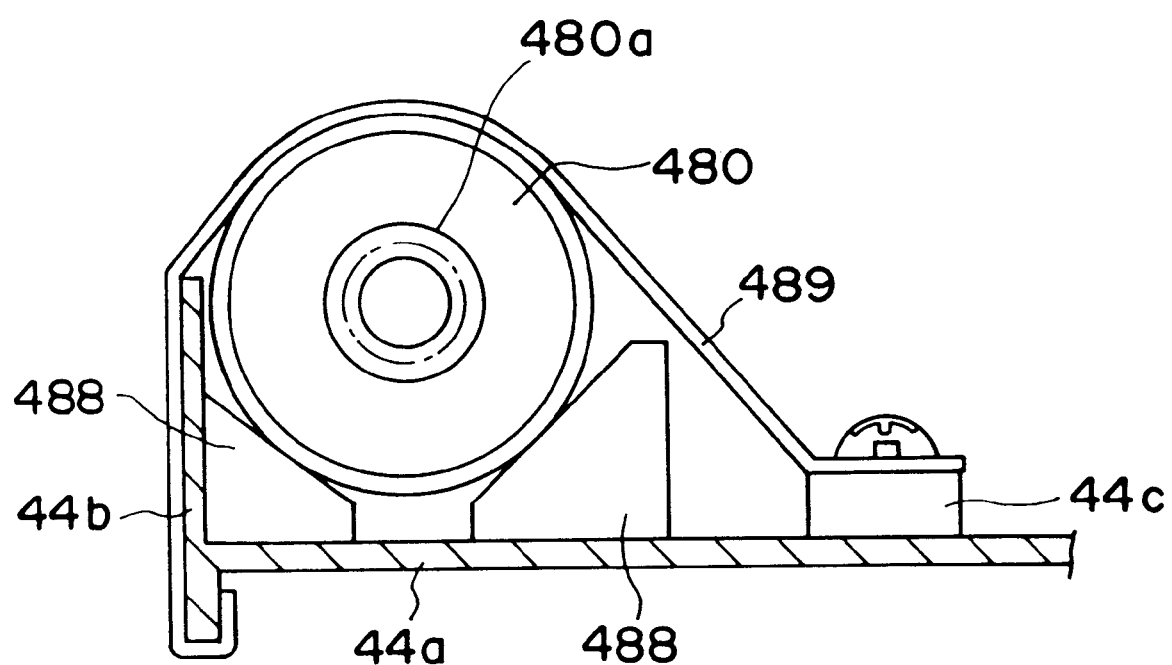
FIG. 9 is a front view which shows the mounting state of the sled motor.

As shown in FIG. 9, the sled motor 480 is placed on a pair of supporting members 488 which are integrally formed with the bottom portion 44a of the support member 44. Each of the supporting members is constructed from two pieces arranged so as to form a V-shaped supporting surface. Further, the sled motor 480 is mounted onto the supporting members 488 by holding the upper portion of the motor 480 with a retaining plate 489 which is formed from a metal plate or the like. Specifically, one end of the retaining plate 489 is bent along the side wall 44b, and its tip portion is formed into a C-shaped hook which is engaged with the lower edge of the side wall 44b. On the other hand, the other end of the retaining plate 489 is mounted onto a mounting portion 44c formed on the bottom portion 44a by means of a screw or the like.

When the sled motor 480 is to be mounted onto the supporting members 488, first the sled motor 480 is positioned onto the supporting members 488 under the condition that a thin metal plate or the like having a prescribed thickness is interposed between the tip of the rotational shaft 480a of the sled motor 480 and the stopper member 487. As described above, the thickness of the metal plate is less than the play, for example 0.02 mm to 0.05 mm. Next, the sled motor 480 is secured onto the supporting members 488 using the retaining plate 489 described above, and then the metal plate which has been interposed between the tip of the rotational shaft 480a and the stopper member 487 is removed therefrom. In this way, it is possible to precisely set the distance between the tip of the rotational shaft 480a and the stopper member 487 so as to be the prescribed distance "d".

Figure 10:
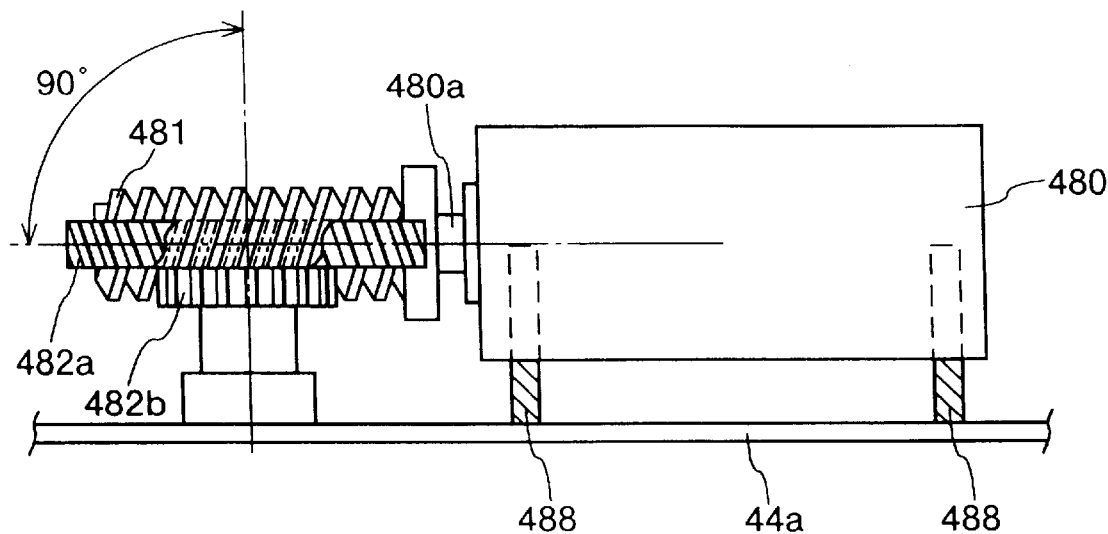
FIGS. 10(a), 10(b) and 10(c) respectively show engagement conditions between a lead screw and a warm wheel used in the sliding feed mechanism, respectively.
Figure 10:
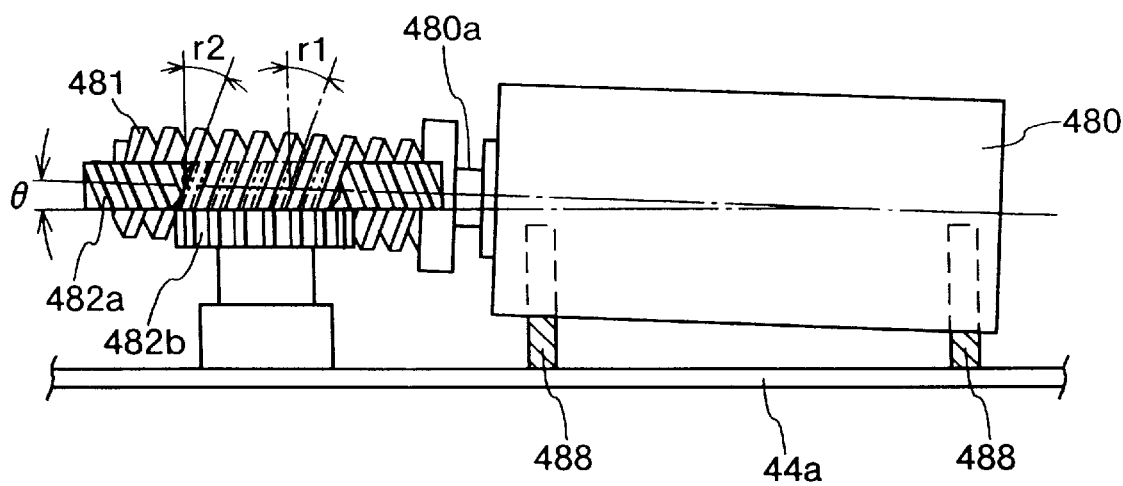
Figure 10:
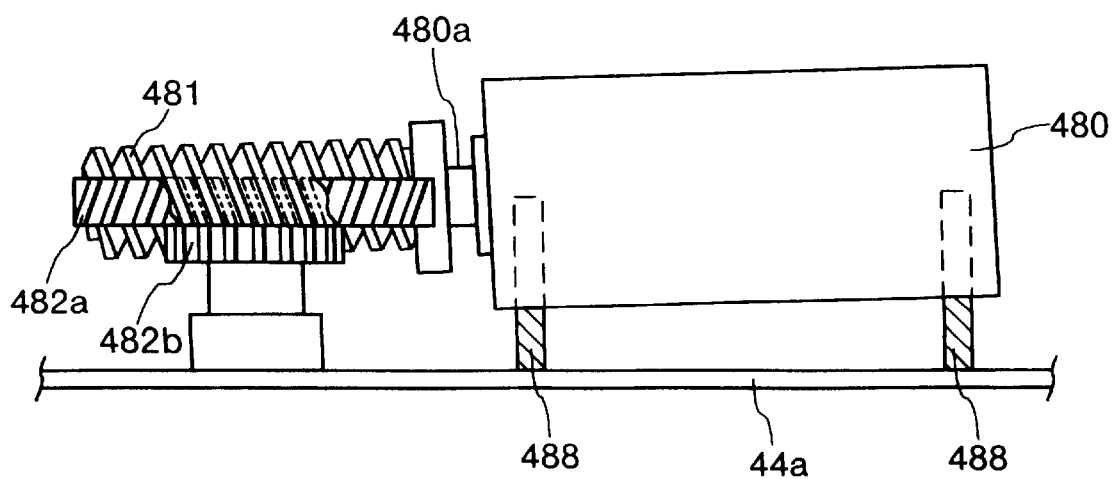

Further, as shown in FIG. 10(a), the lead screw 481 of the sled motor 480 and the worm wheel 482a are arranged in such a manner that their rotational axes are perpendicular to each other, in general. Moreover, in order to move the optical pick-up 47 properly in the radial direction of the optical disc 3 with a high accuracy, each of the lead screw 481 and the worm wheel 482a is formed so as to have teeth with a small module and a small lead angle. However, in a case where such lead screw 481 and the worm wheel 482a are used, there is a case that the lead screw 481 is locked up or bitten with the worm wheel 482a due to meshing interference and thereby it is no longer possible to restore them to their normal meshing state by reverse rotation of the motor.

Such a locking state between the lead screw 481 and the worm wheel 482a can be avoided by constructing the rack gear 483 so that it is elastically deformable toward the guide rod 485 as described above. Another approach is, as shown in FIG. 10(b), to construct a lead angle ($\gamma 1$) of the worm wheel 482a to be larger than a lead angle ($\gamma 2$) of the lead screw 481 of the sled motor 480 and then to mount the sled motor 480 so that the rotational shaft 480a of the sled motor 480 is tilted for an angle $\theta$ with respect to the horizon to achieve a proper meshing between the lead screw 481 of the sled motor 480 and the worm wheel 482a having the above described lead angle ($\gamma 2$). In this regard, it is to be noted that the lead screw 481 is formed with a left-hand thread as described above.

By mounting the sled motor 480 with its rotational shaft 480a being tilted as described above with reference to FIG. 10(b), it becomes possible for the lead screw 481 to have an apparent lead angle which is larger than the lead angle of the lead screw 481 shown in FIG. 10(a) in spite of using the same lead screws 481. Further, the lead angle of the worm wheel 482a shown in FIG. 10(b) is larger than that of the worm wheel shown in FIG. 10(a). This means that the lead angles of the lead screw 481 and worm wheel 482a become larger. In this way, it becomes possible to reduce slipping when the lead 481 is in mesh with the worm wheel 482a, thereby enabling to effectively prevent a locking state from occurring between the lead screw (worm) 481 and the worm wheel 482a with the simple construction.

Further, according to this arrangement shown in FIG. 10(b), since the lead screw 481 is the same as that used in the arrangement shown in FIG. 10(a) and the number of teeth of the worm wheel 482a is the same as that shown in FIG. 10(a), an amount of the movement of the optical pick-up 47 per one rotation of the rotational shaft 480a of the sled motor 480 is also the same as that shown in FIG. 10(a).

Furthermore, according to this arrangement, the rear portion of the sled motor 480 can be lowered as shown in FIG. 10(b), which creates a space above the rear portion of the sled motor 480, thus leading to expanding degree of freedom for design.

Although in the above a description is made with regard to an example where a left-hand thread is formed on the lead screw 481, the present invention is not limited to the example. It is also possible to use a lead screw 481 having a right-hand thread. In this case, the sled motor 480 is mounted so that the rotational shaft 480a of the sled motor 480 is tilted downwardly as shown in FIG. 10(c).

The optical pick-up 47 which is placed on the slider 484 can be moved in the radial direction of the optical disc 3 by means of the above described optical pick-up moving mechanism 48. This optical pick-up 47 is a flat type optical pick-up constructed so as to deflect light reflected from the optical disc 3 by roughly 90 degrees using a mirror (or prism) or the like to guide such light toward a light gathering element such as a photodiode or the like. Further, the optical pick-up 47 comprises an objective lens 47a and an actuator (not shown in the drawings).

As shown in FIGS. 2, 3, 4 and 11, a flexible printed circuit 470 is connected to the optical pick-up 47 for outputting signals read out from the optical disc 3 and for outputting and inputting various controlling signals used for focusing servo and tracking servo and the like. In the flexible printed circuit 470, a plurality of conductors are arranged for supplying the above-mentioned various signals, so that it has a relatively large width.

Figure 11:
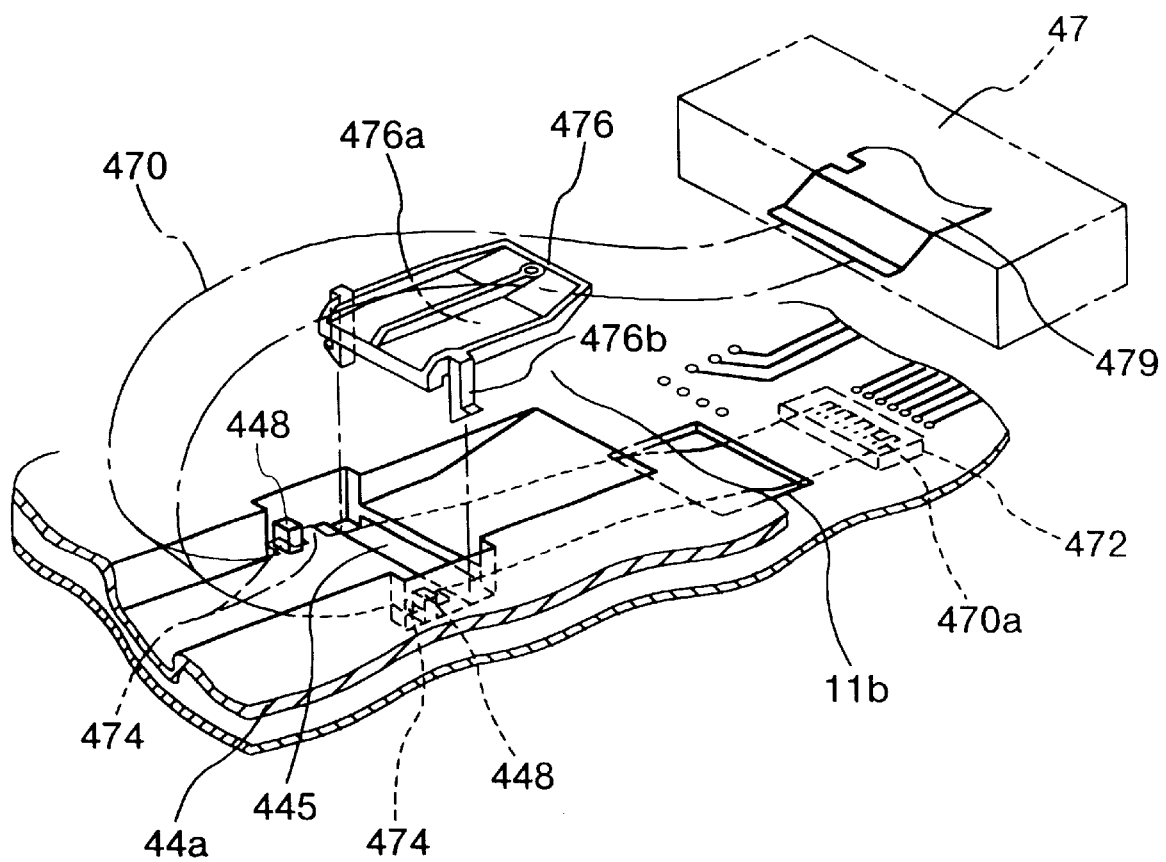
FIG. 11 is a perspective view which shows wiring condition of a flexible printed circuit in the disc drive shown in FIG. 1.
Figure 12:
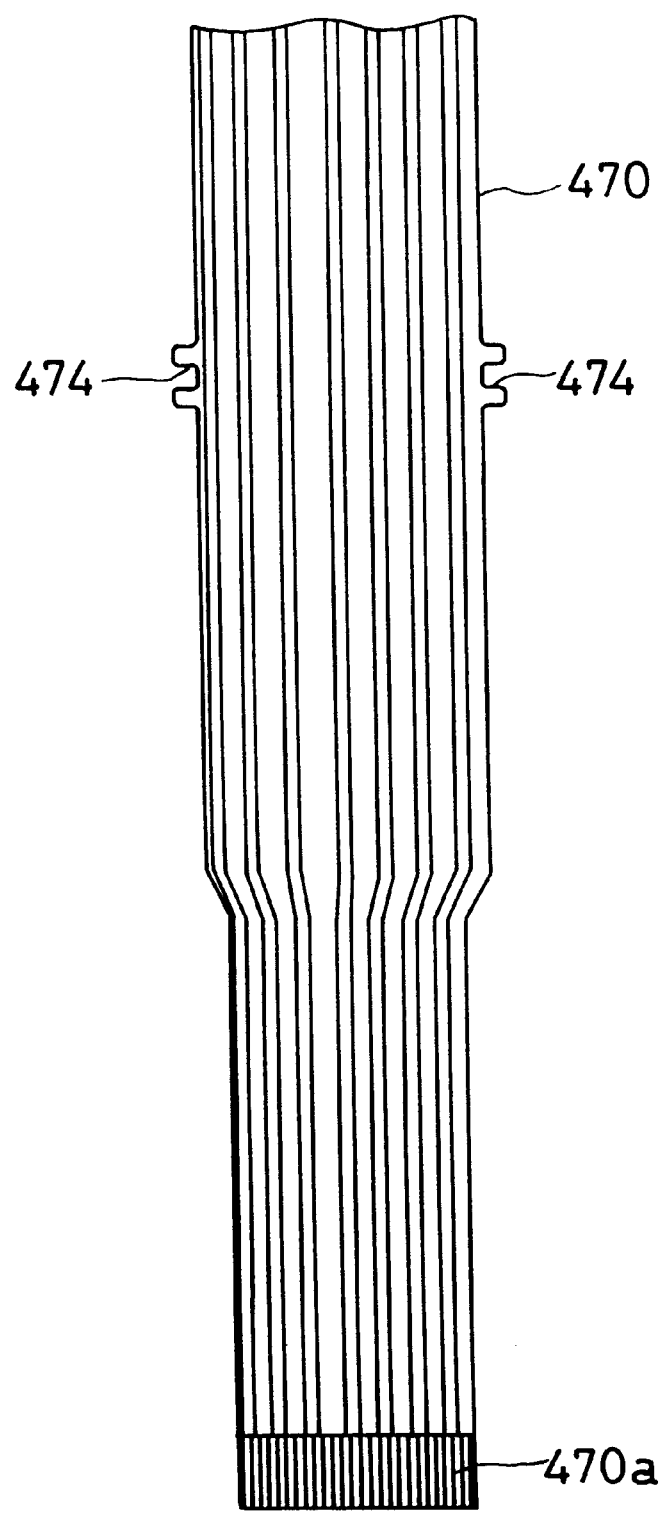
FIG. 12 is a planar view of the flexible printed circuit.

As shown in FIGS. 2, 11 and 12, at the tip end of the flexible printed circuit 470, there is formed a connecting terminal section 470a, and the flexible printed circuit 470 passes through an opening 445 formed in the bottom 44a of the support member 44 and then passes through an opening 11b formed in the printed circuit board 11, and then the connecting terminal section 470a is connected to a mating connector 472 provided on the underside surface of the printed circuit board 11.

Further, as shown in FIGS. 11 and 12, on both edges of the roughly middle portion of the flexible printed circuit 470, a pair of engagement portions 474 are integrally formed with the flexible printed circuit 470. These engagement portions 474 are formed into a concaved protrusion, respectively. As described above, these engagement portions 474 are positioned at a roughly middle portion of the flexible printed circuit 470 in its lengthwise direction such that a portion of the flexible printed circuit 470 between the middle portion and the optical pick-up 47 can have a desired curved form as shown in FIG. 11. By giving such a curved form to the portion of the flexible printed circuit 470, the flexible printed circuit 470 can follow the movement of the optical pick-up 47 without giving any load to the optical pick-up 47 when it is being moved. Further, since the portion of the optical pick-up 47 merely repeats a predetermined deformation according to the movement of the optical pick-up 47, there is no risk that the flexible printed circuit 470 contacts the signal surface of the optical disc 3 and it is caught by surrounding parts.

As shown in FIGS. 7 and 11, the opening 445 through which the flexible printed circuit 470 extends is formed in a concave portion 447 provided in the bottom portion 44a of the support member 44. This opening 445 is formed into an elongated slit having a width slightly larger than the width of the flexible printed circuit 470. In the vicinity of the opening 445 on the side opposite to the optical pick-up 47, there are provided a pair of protrusions 448 which are integrally formed on left and right walls defining the concave portion 447, as shown in FIGS. 7 and 11. The engagement portions 474 formed on the left and right edges of the flexible printed circuit 470 are in engagement with these protrusions 448, respectively.

Figure 13:
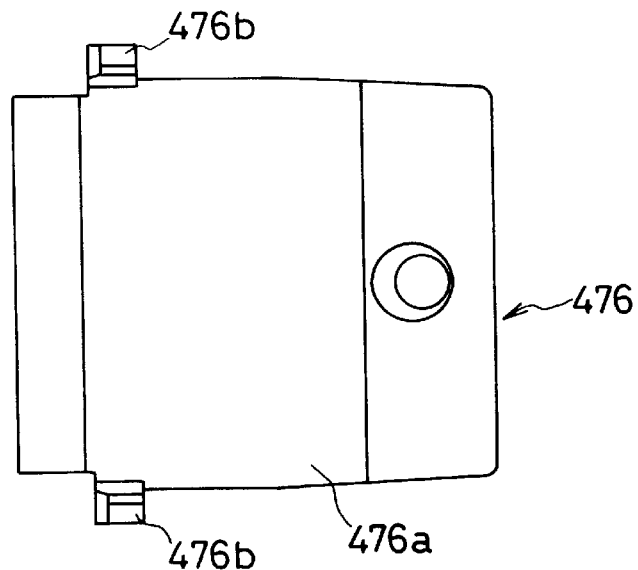
FIGS. 13(a), 13(b) and 13(c) are respectively a planar view, a side view and a bottom view of an opening closure member.
Figure 13:
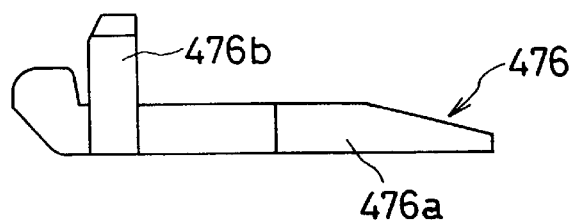
Figure 13:
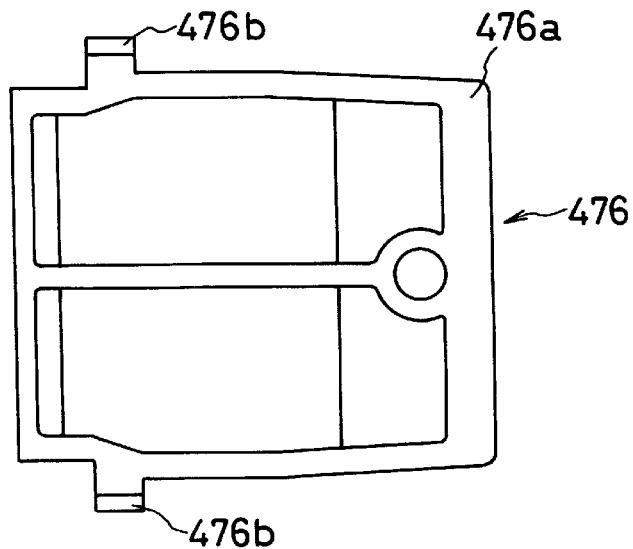

Further, an opening closure member 476 shown in FIG. 2 and FIG. 11 is removably attached to the opening 445. As shown in FIGS. 13(a), 13(b) and 13(c), the opening closure member 476 is generally constructed from a plate-like member 476a which is fitted onto the concave portion 447 of the bottom portion 44a of the support member 44 and a pair of leg portions 476b which are integrally formed with the plate-like member 476a so as to protrude downwardly from the left and right edges of the plate-like member 476a. These leg members 476b are elastically deformable in a direction such that they approach each other. Further, on the tip portion of each leg, there is formed an engagement hook.

In use, first, the left and right engagement portions 474 of the flexible printed circuit 470 which pass through the opening 445 are engaged with the left and right protrusions 448 formed on the walls defining the concave portion 447, and in this state the leg members 476b of the opening closure member 476 are inserted into the opening 445 from both sides of the flexible printed circuit 470, thereby the opening closure member 476 can be removably attached to the opening 445.

As a result, the flexible printed circuit 470 is accurately positioned in its lengthwise direction with respect to the chassis (support member 44) due to the engagement between the engagement portions 474 and the protrusions 484. Accordingly, even if the pick-up 47 is moved, the flexible printed circuit 470 does not move in its lengthwise direction, thereby enabling it to maintain the curved form shown in FIG. 11 and FIGS. 14(a) and 14(b). Further, when the flexible printed circuit 470 is pulled by the motion of the pick-up 47 toward the inner side of the optical disc 3, such a pulling force is not transmitted to the printed circuit board 11, thereby preventing disconnection of the connector 470a from the connector 472. Furthermore, since the opening 445 is being closed by the plate-like member 476a of the opening closure member 476, it is possible to prevent dust or dirt from entering into the space above the chassis 40 through the opening 445 by a sucking force crated by the rotation of the disc 3.

Furthermore, at a portion of the optical pick-up 47 where the flexible printed circuit 470 is connected to the pick-up 47, there is provided a regulating member 479 which regulates an extending direction of the flexible printed circuit 470 from the optical pick-up 47 so as to give a predetermined curved form to the flexible printed circuit 470. This regulating member 479 is formed of a metallic plate having a width slightly larger than the width of the flexible printed circuit 470. In more detail, the regulating member 479 has a flat plate portion mounted onto the upper surface of the optical pick-up 47 and a slanting plate portion extending slantingly and downwardly from the flat plate, and the tip portion of the slanting plate portion is bent horizontally.

In this arrangement, since the flexible printed circuit 470 is held by the regulating member 479 from the upper side thereof, the flexible printed circuit 470 extends from the connecting portion with the optical pick-up 47 slantingly and then it is held by the tip portion of the regulating member 479. In this way, even if the optical pick-up 47 moves from the inner side of the optical disc 3 shown in FIG. 14(a) to the outer side thereof shown in FIG. 14(b), the flexible printed circuit 470 can maintain its ideal curved form, thereby preventing contact of the flexible printed circuit 470 with the signal surface of the optical disc 3. Further, a load exerted on the flexible printed circuit 470 by the movement of the optical pick-up 47 is relieved by the regulating member 479, so that the load exerted on the flexible printed circuit 470 does not affect the connecting portion between the flexible printed circuit 470 and the optical pick-up 47 directly.

In this embodiment, the sled motor 480 of the optical pick-up moving mechanism 48 is controlled by a controlling means (CPU) provided on the printed circuit board 11 together with the spindle motor and the loading motor 61 described hereinafter in detail.

In this case, in order to drive the sled motor 480 with a small voltage at the start of the rotation, it is preferred that the sled motor 480 is controlled such that its rotational shaft 480a is being slightly oscillated by applying high and low pulses to the coil in a predetermined interval. In this way, it is not necessary to apply a large voltage to the motor at the start of the rotation. This is particularly suited for the case where a fine feed of the pick-up 47 is required during a writing or reading operation being carried out. In the case of a small-size motor like the sled motor used in the optical pick-up moving mechanism of the CD-R drive, a pulse voltage of 40 Hz can be applied, for example.

As shown in FIG. 3 and FIG. 4, in front of the mechanism unit 42, there is provided a loading mechanism 50 for displacing the mechanism unit 42 between the lowered position (FIG. 3) and the raised position (FIG. 4) and for moving the disc tray 5 between the loading position and the eject position. This loading mechanism 50 comprises a cam mechanism 51 which is operatively coupled with the mechanism unit 42 and can be moved between a first position (FIG. 3) and a second position (FIG. 4) and a driving mechanism 60 for driving the disc tray 5 and the cam mechanism 51.

The cam mechanism 51 can be operated to move the mechanism unit 42 to either the lowered position when the cam mechanism 51 is in the first position shown in FIG. 3, or the raised position when the cam mechanism 51 is in the second position shown in FIG. 4. In more details, as shown in FIGS. 15 and 16, the cam mechanism 51 includes a cam member 55 arranged so as to be slidable between a first position (FIG. 15) and a second position (FIG. 16) in the sideways direction with respect to the chassis 40 (i.e., the direction orthogonal to the direction of movement of the disc tray 5). The cam member 55 is generally constructed from a roughly plate-shaped horizontal portion 55*a* and a plate-shaped vertical portion 55*b* which is integrally formed on the underside surface of the horizontal portion 55*a* at a position close to the rear edge (at the side of the mechanism unit) so as to be perpendicular to the horizontal portion. That is, the cam member 55 is formed from a member having a roughly T-shaped cross section. This structure can prevent camber from being produced during a cooling process in the injection molding of resin materials.

Formed on the horizontal portion 55*a* of the cam member 55 are sideways guide grooves 56*a*, 56*b* which engage respectively with a pair of protrusions 52*a*, 52*b* which protrude from the top of the front portion of the chassis 40. These guide grooves 56*a*, 56*b* are used to guide the cam member 55 between the first and second positions. Further, the underside surface of the horizontal portion 55*a* is provided with an engaging pin (not shown in the drawings) which is inserted into an elongated slot formed in the top of the front portion of the chassis 40. This engaging pin is adapted to interlock with an emergency eject mechanism 90 (described below).

Further, on the horizontal portion 55*a* of the cam member 55, there is formed a disc tray locking portion 55*d* which is engaged with the rib 5*c* formed on the rear surface of the disc tray 5 when the cam member 55 is displaced from the first position to the second position to restrict the movement of the disc tray 5.

The vertical portion 55*b* of the cam member 55 is positioned to face the front wall which defines the opening 41 of the chassis 40. Formed in the vertical portion 55*b* are a pair of cam grooves 58*a*, 58*b* each having the same shape. Each of the cam grooves 58*a*, 58*b* is constructed from horizontally extending upper and lower grooves 581, 583 and a slanting groove 582 which connects the upper groove 581 and the lower groove 583.

Further, the guide pins (following members) 430*a*, 430*b* which are provided on the front surface of the base frame 43 of the mechanism unit 42 as described above are inserted into the cam grooves 58*a*, 58*b*, respectively. In this way, when the cam member 55 is moved between the first position and the second position, the guide pins 430*a*, 430*b* are slidably moved along the cam grooves 58*a*, 58*b* in the up and down direction.

Namely, when the cam member 55 is positioned at the first position, the guide pins 430*a*, 430*b* are engaged with the lower grooves 583 (FIG. 15), and the front portion of the mechanism unit 42 is in the lowered position shown in FIG. 3. When the cam member 55 is moved from the first position to the second position, the guide pins 430*a*, 430*b* are moved up by the slanting grooves 582, thereby causing the front portion of the mechanism unit 42 to move from the lowered position toward the raised position. Then, when the cam member 55 reaches the second position, the guide pins 430*a*, 430*b* engage with the upper grooves 581 (FIG. 16), and the front portion of the mechanism unit 42 is displaced to the raised position shown in FIG. 4.

Further, a protrusion 59 is integrally formed on an end portion of the horizontal portion 55*a* of the cam member 55 to engage with the cam member movement restricting groove 7 formed in the underside surface of the disc tray 5. As a result, when the protrusion 59 is engaged with the first movement restricting groove 7*a* of the disc tray 5, the cam member 55 is prevented from moving in the sideways direction, whereby the cam member 55 is held at the first position. Then, in accordance with the movement of the disc tray 5 toward the playback position, the protrusion 59 slides from the first movement restricting groove 7*a* to the second movement restricting groove 7*b*, and upon moving through the slanting groove of the second movement restricting groove 7*b*, the cam member 55 is caused to displace within the range of the lower grooves 583 of the cam grooves 58*a*, 58*b* of the cam member 55. Then, when the protrusion 59 reaches the position of the third movement restricting groove 7*c*, the cam member 55 is allowed to move toward the second position.

In this connection, it is to be noted that when the cam member 55 is displaced to the second position, the disc tray locking portion 55*d* formed on the horizontal portion 55*a* of the cam member 55 is engaged with the rib 5*c* formed on the underside surface of the disc tray 5 as described above, thereby the disc tray 5 is restricted to move further, that is the disc tray 5 being locked up.

As shown in FIG. 15 and FIG. 16, the drive mechanism 60 of the loading mechanism 50 comprises a loading motor (DC motor) 61 capable of forward/reverse rotation provided on the underside surface of the front portion of the chassis 40, a pinion gear 62 mounted to a rotation axis 61*a* of the loading motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64*a* being integrally formed on top of this cylindrical portion so as to be coaxially therewith. Meshing with the small gear 64*a* of the third gear 64 is an operative gear 65 which also meshes with the first and second racks 6*a*, 6*b* of the disc tray 5. Namely, the operative gear 65 is constructed from a lower gear 65*a* which meshes with the small gear 64*a* of the third gear 64, and an upper gear 65*b* which meshes with the rack 6 of the disc tray 5, in which the upper gear 65*b* being integrally formed on the same axis as the lower gear 65*a*.

In this embodiment, the gears 62–65 are flat teeth gears, and a combination thereof constitutes a rotational speed reduction mechanism for the loading motor 61 in the loading mechanism 50.

The operative gear 65 is rotatably mounted to a rotation axis 67 provided on a planetary arm 66, and this planetary arm 66 is rotatable mounted to a rotation axis 64*b* of the third gear 64. The planetary arm 66 includes a rotation portion 66*a* which is rotatably fitted onto the cylindrical portion of the third gear 64, and first and second arms 66*b*, 66*c* which extend from the rotation portion 66*a*, so that the whole of the planetary arm 66 has a roughly v-shaped structure.

One end of the first arm 66*b* of the planetary arm 66 is provided with the protruding rotation axis 67 described above to which the operative gear 65 is rotatable mounted. Namely, the operative gear 65 rotates about the axis 67 of the first arm 66*b* which is served as a rotation axis thereof while the operative gear 65 also turns around the axis 64*b* which serves as a revolution axis, so that the operative gear 65 functions as a planetary gear which can be turned around the axis 64*b* along the second rack 6*b* with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward, and the tip portion of this pin 68 is fitted into an engaging portion 55c formed in the cam member 55.

In this connection, as shown in FIG. 15 and FIG. 16, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc eject position and the disc loaded position with the operative gear 65 being held at a prescribed position, and a second operation when engaged with the second rack 6b of the disc tray 5, in which the cam member 55 is moved between the first position and the second position by the revolution of the operative gear 65.

Specifically, while the protrusion 59 provided on the top of the horizontal portion 55a of the cam member 55 is in engagement with the first movement restricting groove 7a in the underside surface of the disc tray 5, the movement of the cam member 55 from the first position to the second position is restricted. Accordingly, during such time, in other words during the time that the disc tray 5 is moving between the eject position and the loaded position, the pin 68 of the second arm 66c of the planetary arm 66 is engaged with the engaging portion 55c of the cam member 55, thereby making it impossible for the planetary arm 66 to be turned around the axis 64b. As a result, the operative gear 65 is being held at a prescribed position while the protrusion 59 of the cam member 55 is engaged with the first movement restricting groove 7a of the disc tray 5. In this state, as shown by the dashed line in FIG. 3, the operative gear 65 engages with the first linear rack 6a of the disc tray 5, whereby the disc tray 5 is moved from the disc eject position to the disc loaded position according to the rotation of the operative gear 65 caused by the rotation of the loading motor 61, and in this way the operative gear 65 functions as a driving gear for moving the disc tray 5.

On the other hand, when the disc tray 5 moves accordingly to a position just before the disc loaded position, the protrusion 59 of the cam member 55 moves from the first movement restricting groove 7a to the second movement restricting groove 7b of the disc tray 5, and this causes the cam member 55 to be displaced in the sideways direction (toward the second position) by a small amount. When the disc tray 5 moves further, the protrusion 59 reaches the third movement restricting groove 7c, whereby the cam member 55 is allowed to move from the first position to the second position. In this state, as shown by the dashed line in FIG. 4, since the operative gear 65 is engaged with the arc-shaped second rack 6b and the cam member 55 is able to move to the second position and therefore the planetary arm 66 can be turned around the axis 64b, the operative gear 65 moves along the arc-shaped second rack 6b in accordance with the rotation of the loading motor 61. Namely, the operative gear 65 acts as a planetary gear.

In accordance with such a turning movement of the operative gear 65, the planetary arm 66 rotates clockwise around the common axis (revolution axis) 64b from the position shown in FIG. 15 to the position shown in FIG. 16, which in turn causes the second arm 66c of the planetary arm 66 to rotate in the same direction. In accordance with this rotation of the second arm 66c, the cam member 55 is driven by means of the pin 68 coupled with the engaging portion 55c, and thereby the cam member 55 moves from the first position shown in FIG. 15 toward the second position shown in FIG. 16. In accordance with this movement of the cam member 55 from the first position toward the second position, the front guide pins 430a, 430b of the base frame 43 of the mechanism unit 42 rise up along the slanting grooves 582, 582, whereby the front portion of the mechanism unit 42 is also displaced from the lowered position shown in FIG. 3 to the raised position shown in FIG. 4.

Figure 21:
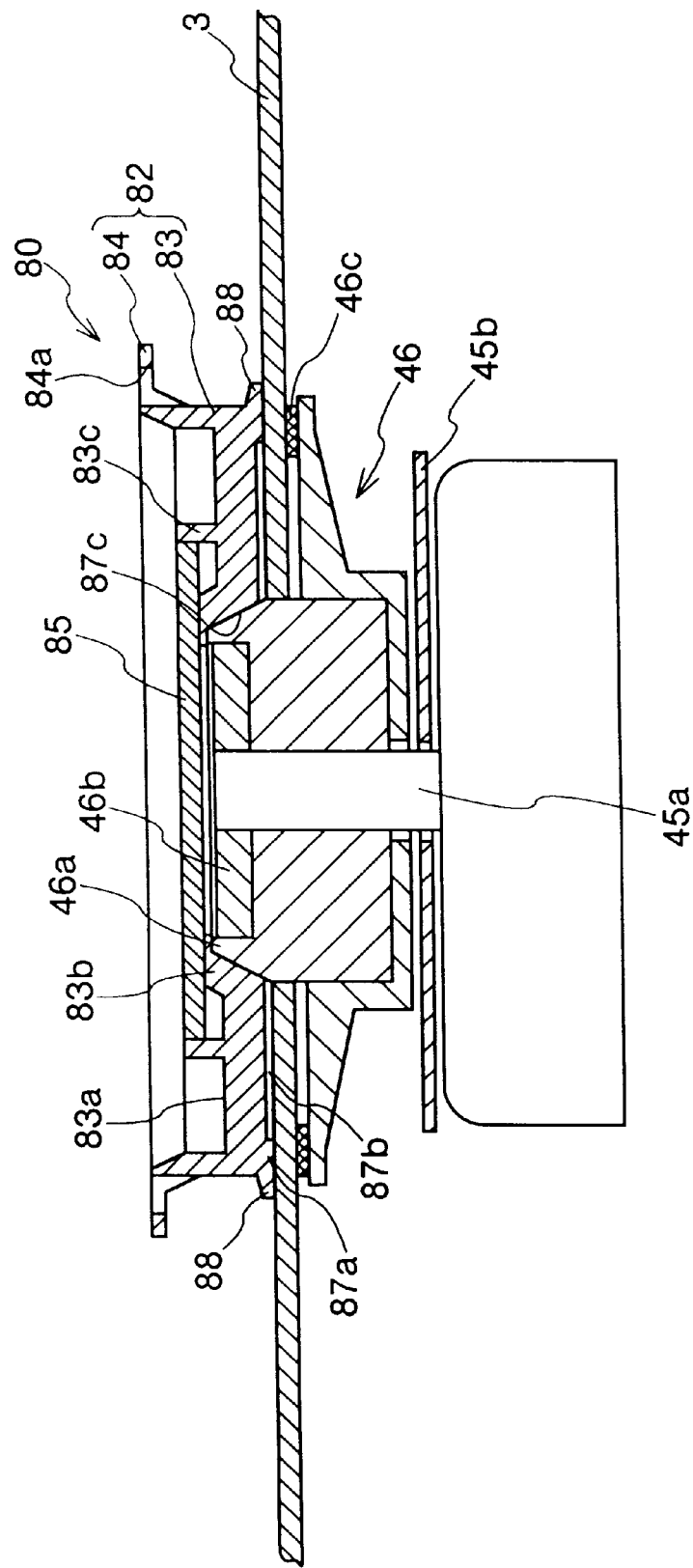
FIG. 21 is a cross sectional view taken along line A—A in FIG. 19 which shows the condition that a disc which is placed on the turntable is held between the disc clamper and the turntables.

Further, as shown in FIG. 21, on the upper portion of the chassis 40 of the disc drive main body 2, there is provided a disc clamper 80 for holding the optical disc 3 between the turntable 46 and the disc clamper 80.

Figure 17:
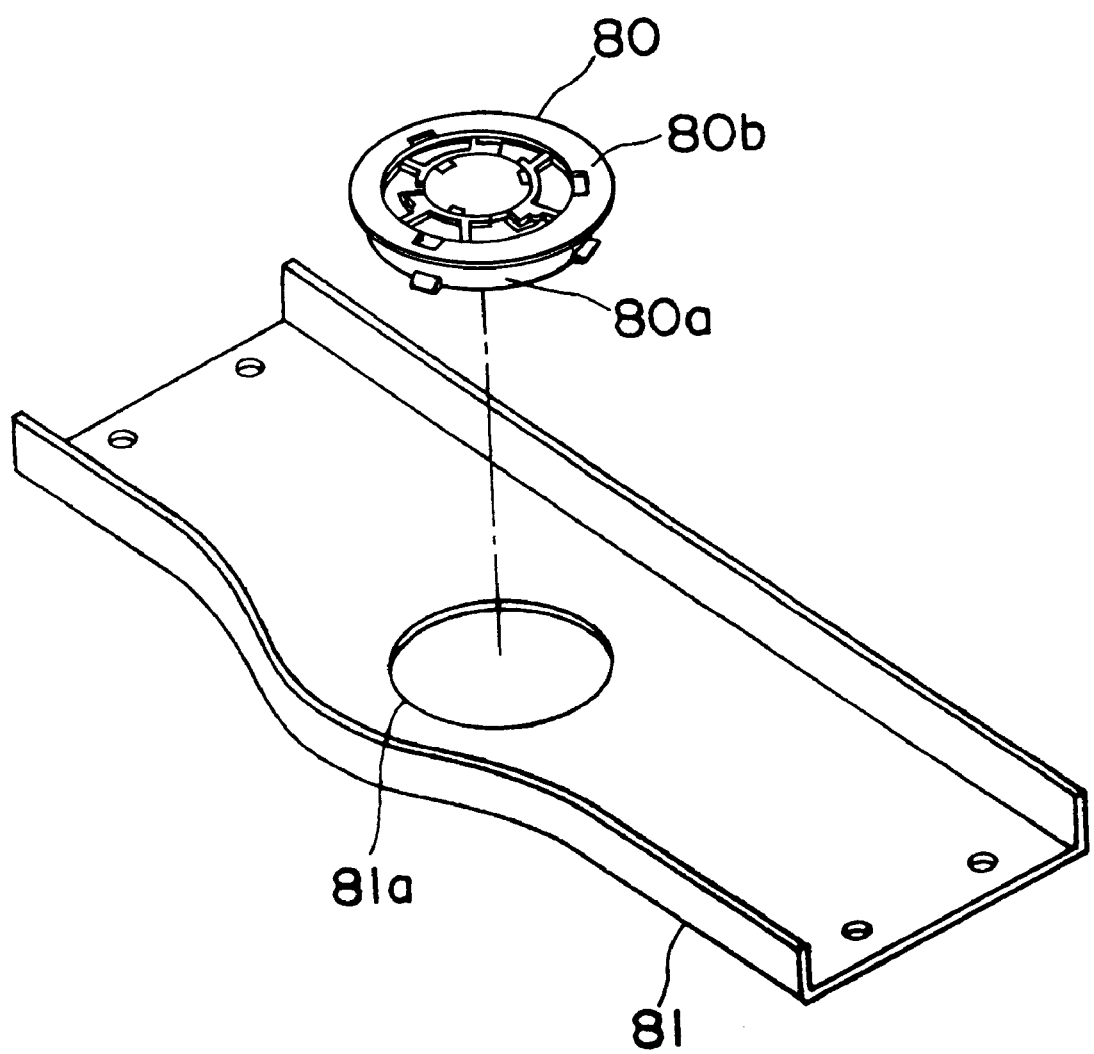
FIG. 17 is a perspective view which shows the structure of a disc clamper used in the optical disc drive shown in FIG. 1.

As shown in FIG. 17, the disc clamper 80 is supported rotatably and vertically movably by a plate form support member 81 having an opening 81a at its central part. The support member 81 is provided bridging the upper part of the chassis 40 in a lateral direction, and its respective ends are fastened to the fixing parts 40c of the chassis 40 with bosses (or rivets).

On the other hand, as shown in FIG. 18 to FIG. 21 in detail, the disc clamper 80 comprises a disc clamper main body 82 constructed from a flat cylinder shaped cylindrical part 83 having a bottom thereof, which is to be inserted into the opening 81a of the support member 81, and a flange part 84 formed on the upper outer periphery of the cylindrical part 83 and to be supported onto the upper surface of the support member 81, and a disc-shaped iron member (iron plate) 85 serving as an attraction means to be attracted to a permanent magnet 46b embedded in the turntable 46. The cylindrical part 83 of the disc clamper main body 82 is set to have a diameter substantially equal to the diameter of a ring-shaped pad 46c provided in the circumference of the center hub 46a on the upper side (side for holding the optical disc 3) of the turntable 46.

Figure 19:
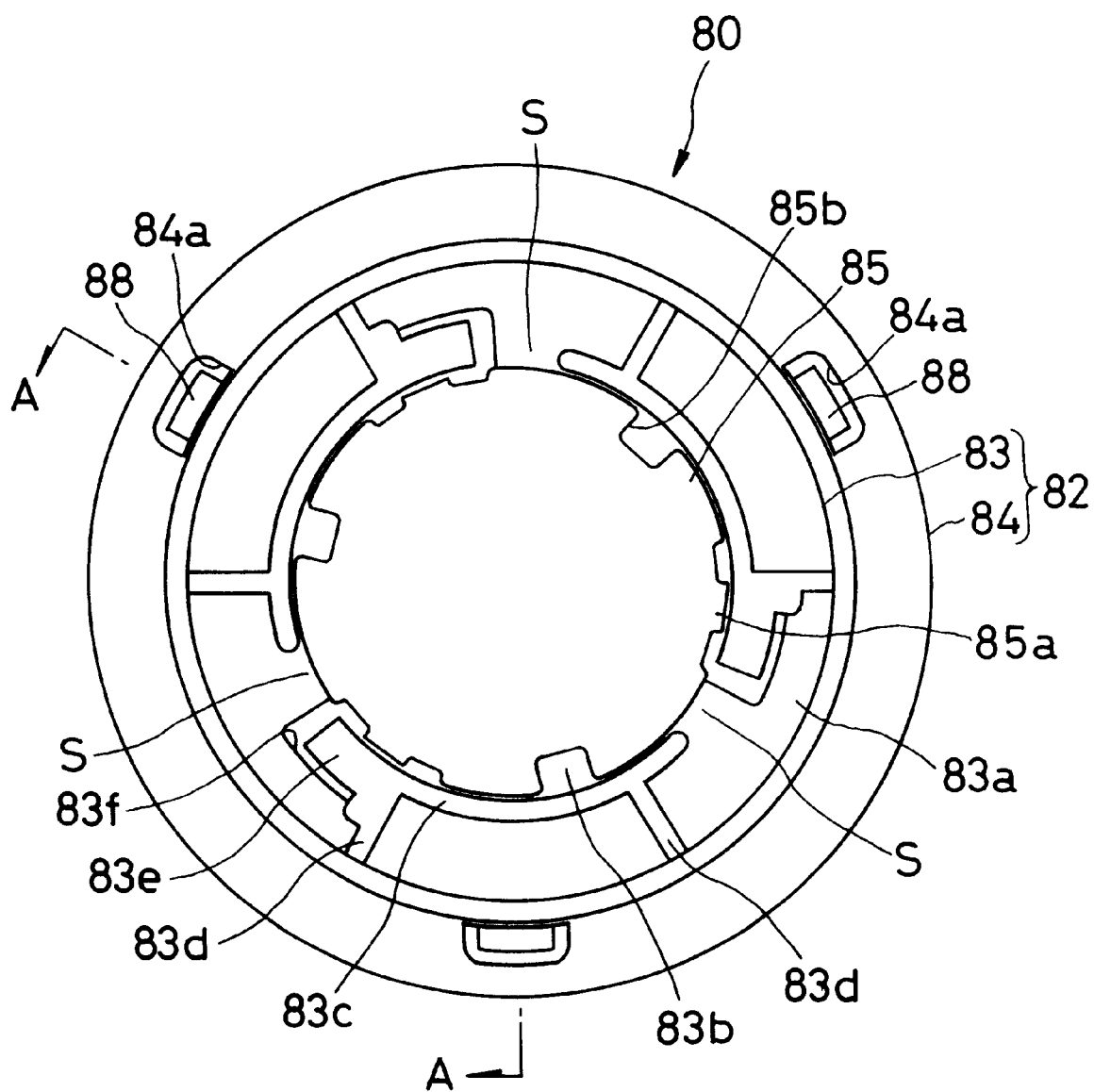
FIG. 19 is a planar view of the disk clamper.
Figure 20:
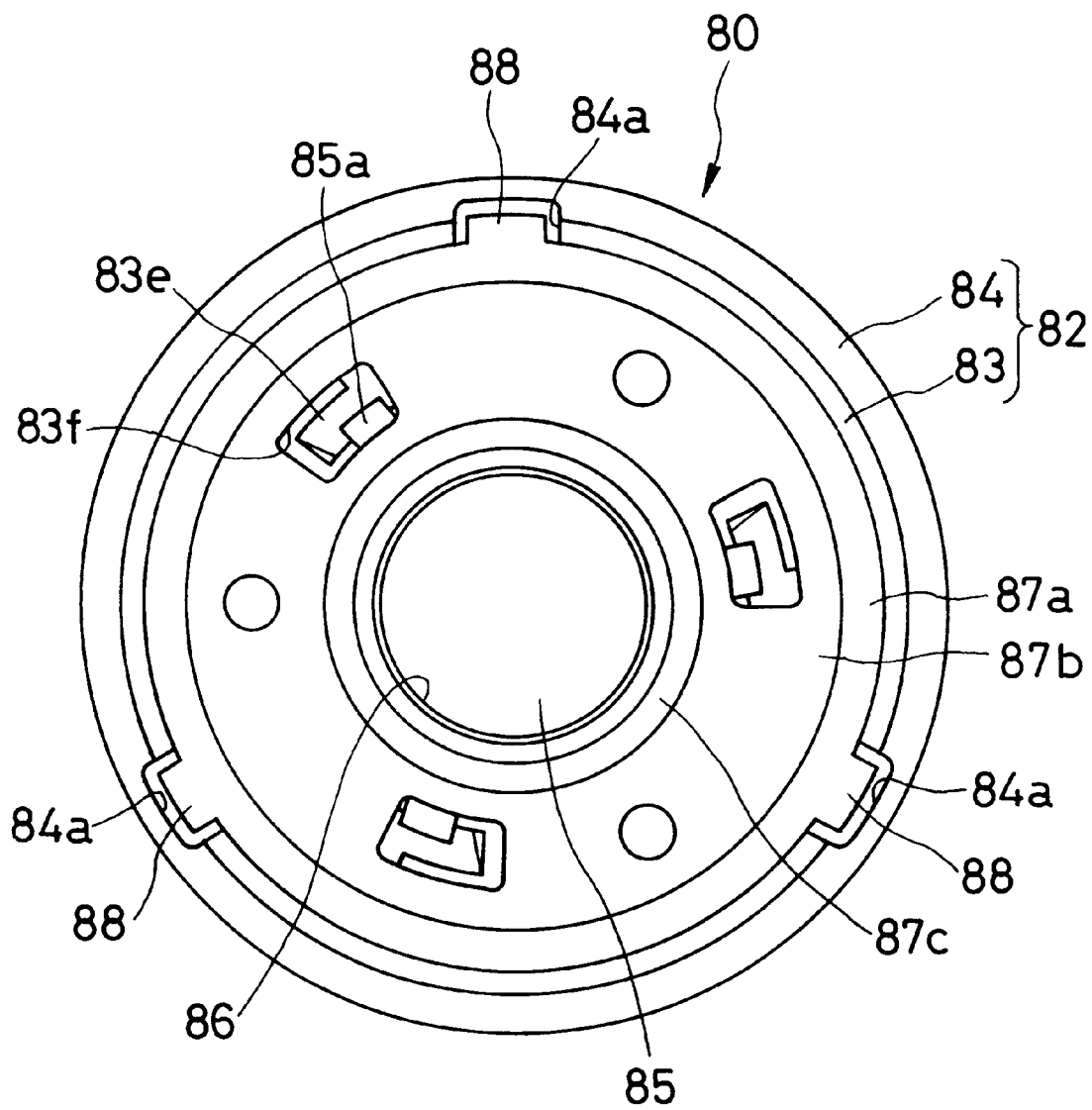
FIG. 20 is a bottom view of the disk clamper.

Hereinbelow, the structure of the disc clamper 80 will be described in more detail with reference to FIG. 18 to FIG. 21. Here, FIG. 18 is an exploded perspective view of the disc clamper, FIG. 19 is a plan view of the disc clamper, FIG. 20 is a bottom view of the disc clamper, and FIG. 21 is a sectional view taken along the line A—A in FIG. 19 showing the state of holding the disc placed on the turntable.

Figure 18:
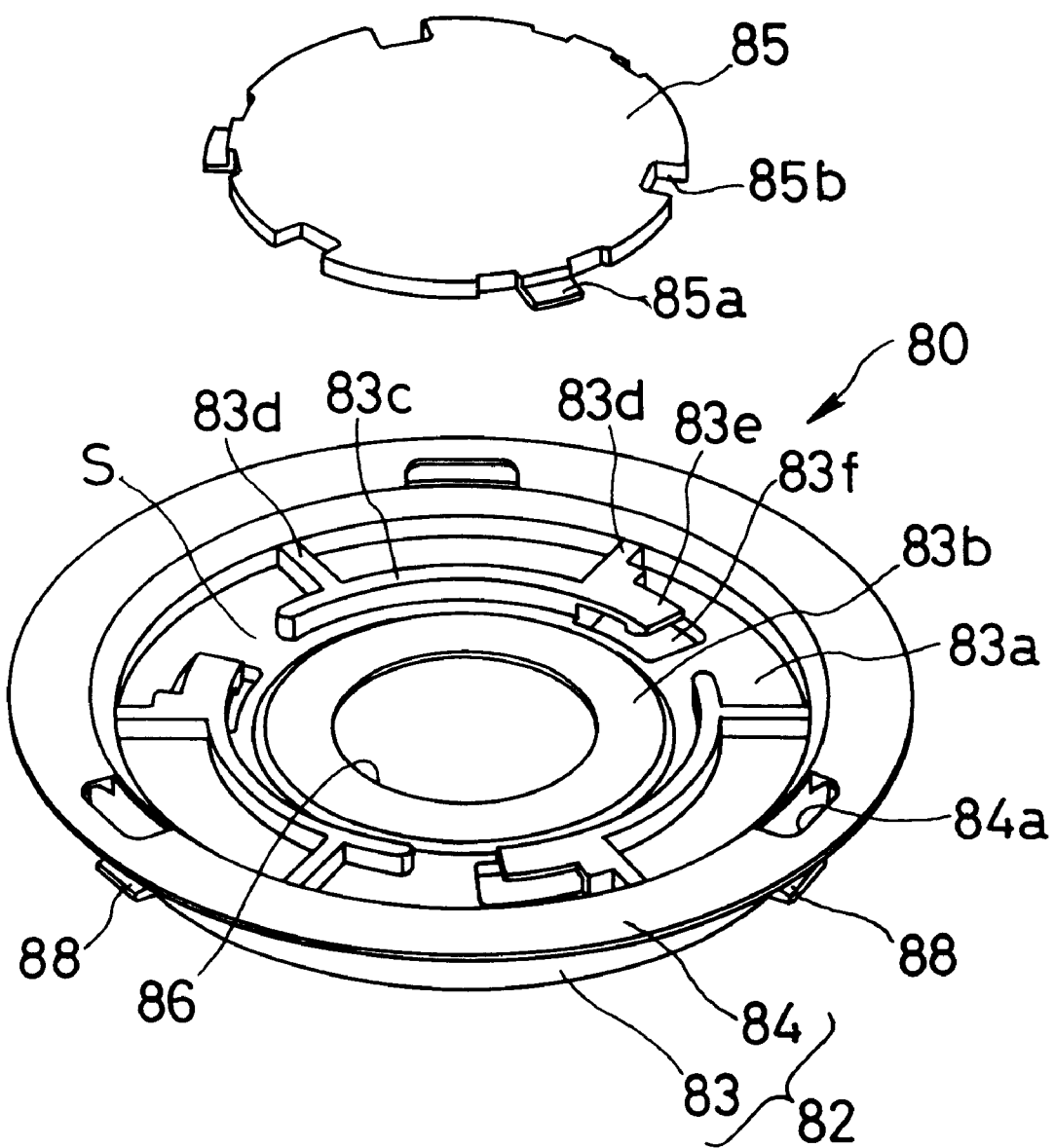
FIG. 18 is an exploded view of the disk clamper.

As shown in FIG. 18, the inner region of the cylindrical part 83 of the disc clamper main body 82 is formed to have a bottom part given in a recessed form. The bottom part includes, from its outer side, a ring-shaped bottom surface part 83a, and a ring-shaped support part 83b for an attracted member which is formed inside the bottom surface part 83a and has a slightly larger height than the ring-shaped bottom surface part 83a. An opening 86 is formed at the center of the support part 83b.

In the ring-shaped bottom surface part 83a, three arc-shaped iron plate positioning ribs 83c are formed integrally in the circumferential direction with equal intervals via a specified space S. Further, two ribs 83d extending in the radial direction to the inner peripheral surface of the recessed part are formed integrally on the outer side of each of the iron plate positioning ribs 83c. Furthermore, a protrusion 83e for holding the attracted member (iron plate) 85 is integrally formed at one end in the circumferential direction of each arc-shaped iron plate positioning rib 83c so as to have a specified space between the upper surface of the support part 83b and the lower surface of the protrusion 83e.

In addition, openings 83f for receiving a die at the time of molding are formed in predetermined parts of the bottom surface part 83a below the respective protrusions 83e.

On the other hand, the attracted member 85 is formed having a size to fit to the circle defined by the positioning ribs 83c. On the circumference of the attracted member 85, three locking protrusions 85a are integrally formed so as to extend in the radial direction. Each of the protrusions 85a has a size such that they can be filled into the spaces S between the positioning ribs 83c, and these protrusions 85a are arranged at intervals corresponding to the spaces S. Further, indentations 85b to be engaged with a jig are formed at positions between the locking protrusions 85a in the circumference of the attracted member 85.

In incorporating the attracted member 85 having the above structure into the disc clamper main body 82, first, the attracted member 85 is placed on the support part 83b so as to make the three locking protrusions 85a of the attracted member 85 to fit to the respective spaces S between the iron plate positioning ribs 83c. Then, by engaging a jig (not shown in the drawing) to the indentations 85b, the attracted member 85 is turned to bring the locking protrusions 85a to be positioned on the lower side of the protrusions 83e of the respective arc-shaped reinforcing ribs 83c. By so doing, the attracted member 85 is assembled integrally to the disc clamper main body 82 with respective ones of its three locking protrusions 85a held by the corresponding protrusions 83e of the reinforcing ribs 83c, as shown in FIG. 19 and FIG. 20.

As shown in FIG. 20, the outer bottom surface of the cylindrical part 83 of the disc clamper main body 82 is formed so as to have a ring-shaped disc holding part 87a on the outer periphery side, a ring-shaped recess 87b which is formed on the inside of the disc holding part 87a and somewhat depressed than the disc holding part 87a, and a ring-shaped tapered part 87c which is formed on the inside of the ring-shaped recess 87b continuing to the opening 86. As shown in FIG. 21, the tapered part 87c corresponds to the tapered part of the center hub 46a of the turntable 46, and serves as the guiding surface when the clamper is attracted to the turntable 46.

Moreover, on the outer periphery at the lower part of the cylindrical part 83 of the disc clamper main body 82, three disk pressing protrusions 88 are formed integrally so as to protrude outward in the radial direction at an equal (120 degrees) interval. Each of the disc pressing protrusions 88 is formed to have a width of about 3 mm in the circumferential direction, and protruding outward by about 1 mm in the radial direction. The lower face of the disc pressing protrusions 88 forms a common surface that continues to the surface of the disc holding part 87a. Needless to say, the size, number, and the formation positions of the disc pressing protrusions 88 are not particularly limited to the size, number, and positions described in the above, and the pressing protrusions 88 may be, for example, four in number formed at an interval of 90 degrees, or five formed at an interval of 72 degrees.

Furthermore, as shown in FIG. 18 to FIG. 20, in the flange part 84 of the disc clamper main body 82, openings 84a for permitting the die to go through at the time of the molding are formed at positions corresponding to the disc pressing protrusions 88.

As shown in FIG. 21, according to the disc clamper 80 having the above structure, when the attracted member 85 of the disc clamper 80 is attracted to the magnet 46b of the turntable 46 in the state where the optical disc 3 is supported on the ring-shaped pad 46c of the turntable 46, the optical disc 3 is held between the disc holding part 87a of the disc clamper 80 and the ring-shaped pad 46c of the turntable 46. In this case, the disc pressing protrusions 88 abut on the upper surface of the optical disc 3 at positions on the outside of the outer diameter of the turntable 46. Because of this, the upper surface of the optical disc 3 can be pressed over a wider range, so that it is possible to prevent vibrations due to eccentric rotation which is apt to occur when a disc clamper with large diameter is used, and at the same time, it is possible to effectively prevent the generation of flutter when the optical disc 3 is rotated.

Moreover, since the disc clamper 80 has the structure as described above, it is possible to form the clamper 80 with reduced weight which facilitates smooth control of the rotational speed of the optical disc 3. In addition, the above structure makes it possible to fabricate the disc clamper main body 82 by injection molding, and the number of required part items is only two and their assembly is easy, so that this invention is advantageous from the viewpoints of manufacturing processes as well as manufacturing cost.

Furthermore, in the above embodiment, the permanent magnet is installed in the turntable 46 and the attracted member 85 as an attraction means made of iron disc is provided in the disc clamper 80. However, the situation may be changed by installing the permanent magnet in the disc clamper 80.

The disc drive described in the above embodiment further includes an emergency ejection mechanism for the disc tray 5 indicated by the symbol 90 in FIG. 2 to FIG. 4. This emergency eject mechanism 90 is provided for ejecting an optical disc 3 placed on the disc tray 5 in case the loading motor 61 is disabled to operate due to a power outage or the like while the optical disc 3 is being rotated for playback. Namely, in this emergency eject mechanism 90, a jig is inserted into the main body 2 from the outside to forcedly displace the cam member 55 from the second position to the first position to push out a tip portion of the disc tray 5 from the main body 2, and then the disc tray 5 is manually moved forward to eject the optical disc 3.

Next, a description of the operation of the disc drive 1 will be given below.

When the disc drive 1A is not in use, the empty disc tray 5 is housed inside the casing 10 (inside the main body 2). That is the disc tray 5 is in the disc loaded position (disc play back position). In this state, as shown in FIG. 4, the mechanism unit 42 is in the raised position, the cam member 55 is in the second position shown in FIG. 15, and the protrusion 59 of the horizontal portion 55a of the cam member 55 is in the third movement restriction groove 7c. Further, as shown by the dashed lines in FIG. 4, the operative gear 65 of the drive mechanism 60 is in engagement with an end portion of the second rack 6b which is far away from the first rack 6a thereof.

Now, if an eject operation is carried out, the loading motor 61 will rotate in a prescribed direction, whereby the operative gear 65 is caused to rotate in the clockwise direction shown in FIG. 4 through the rotational speed reduction mechanism. In this state, the operative gear 65 acts as a planetary gear which can be turned around the revolution axis 64b, and in accordance with this revolution, the operative gear 65 moves along the second rack 6b toward the first rack 6a. In accordance with the revolution of the operative gear 65, the planetary arm 66 rotates in the counterclockwise direction about the revolution axis (common axis) 64b. In accordance with the rotation of the planetary arm 66, the second arm 66c causes the cam member 55 to move, via the pin 68, from the second position shown in FIG. 4 (FIG. 16) to the first position shown in FIG. 3 (FIG. 15), whereby the mechanism unit 42 is also moved from the raised position to the lowered position. In this case, while the cam member 55 is moving from the second position to the first position, the protrusion 59 on top of the horizontal portion 55a of the cam member 55 slides along the third movement restricting groove 7c, and reaches the first movement restricting groove 7a via the second movement restricting groove 7b.

At that point, the operative gear 65 moves from the arc-shaped second rack 6b to the linear first rack 6a, and the protrusion 59 of the cam member 55 also moves from the second movement restricting groove 7b to the first movement restricting groove 7a. When the protrusion 59 of the cam member 55 is moved to the first movement restriction groove 7a, the cam member 55 is restricted from moving in the sideways direction, so that the rotation of the planetary arm 66 is also restricted. In this state, the operative gear 65 acts as a driving gear to drive the disc tray 5 with being held at that position. As a result, as shown by the dashed line in FIG. 3, the operative gear 65 engages with the first rack 6a of the disc tray 5, whereby the disc tray 5 is moved from the loaded position to the eject position according to the rotation of the motor 61. In this state, the mechanism unit 42 has been displaced to the lowered position at a prescribed spacing from the disc clamper 80. Accordingly, the disc clamper 80 and the turntable 46 do not hinder the eject operation of the disc tray 5.

Now, if a loading operation is carried out by placing the optical disc 3 into the disc supporting portion 5a of the disc tray 5 which has been ejected to the outside through the aperture 15a of the front panel 15, the loading motor 61 will rotate in the reverse direction (i.e., the direction opposite to the direction described above), thereby causing the operative gear 65 to rotate, via the rotational speed reduction mechanism, in the counterclockwise direction (i.e., reverse direction) shown in FIG. 3. Accordingly, the disc tray 5 moves backward (toward the rear of the disc drive) through the aperture 15a to the disc loaded position. In this way, the optical disc 3, which is supported at a prescribed position on top of the disc tray 5, is also transported to the disc loaded position (back position) inside the main body 2.

During the loading operation of the disc tray 5, namely while the disc tray 5 is moving backward, the operative gear 65 engages with the first rack 6a on the underside surface of the disc tray 5, and the protrusion 59 of the cam member 55 is guided along the first movement restriction groove 7a. Accordingly, the cam member 55 is held at the first position, and is therefore, unable to move to the second position. Consequently, the planetary arm 66 is held at a prescribed position so as to be unable to rotate. In this case, the operative gear 65 rotates at that position, so that it acts as a driving gear for driving the disc tray 5. Further, in this state, the front portion of the mechanism unit 42 is held at the lower position.

When the disc tray 5 approaches the disc loaded position, the protrusion 59 formed on the cam member 55 moves from the first movement restriction groove 7a to the second movement restriction groove 7b, thereby causing the cam member 55 to move slightly in the sideways direction. Then, when the disc tray 5 reaches the disc loaded position, the protrusion 59 of the cam member 55 has moved to the third movement restriction groove 7b via the second movement restriction groove 7b, thereby enabling the cam member 55 to move to the second position, which in turn also makes it possible for the planetary arm 66 to rotate. In this state, the operative gear 65 moves from the first rack 6a to the second rack 6b.

In this state, the movement of the disc tray 5 is restricted while the planetary arm 66 is capable of revolution. Therefore, if the operative gear 65 is rotated by the loading motor 61, the operative gear 65 moves and turns along the arc-shaped second rack 6b around the axis 64b. Therefore, in this state, the operative gear 65 acts as a planetary gear.

When the operative gear 65 acts as a planetary gear and moves along the arc-shaped second rack 6b as described above, the planetary arm 66 also rotates in accordance with the movement of the operative gear 65, around the revolution axis (common axis) 64b in the clockwise direction shown in FIG. 3. When the planetary arm 66 rotates in this way, the second arm 66c of the planetary arm 66 also rotates in the same manner in the clockwise direction, thereby causing the cam member 55 to move from the first position to the second position.

In accordance with the movement of the cam member 55, the guide pins 430a, 430b of the front end of the base frame 43 of the mechanism unit 42 slide along the slanting grooves 582 of the cam grooves 58a, 58b and move upward to the upper grooves 581. Accordingly, the mechanism unit 42 is displaced from the lowered position to the raised position, whereby the center hub 46a of the turntable 46 fits into the central hole 3a of the optical disc 3 which is placed on the disc tray 5 and has been transported to the disc loaded position.

In this process, the disc clamper 80 is attracted to the permanent magnet 46b of the turntable 46, and the optical disc 3 is held between these two components. Namely, as shown in FIG. 21, the attracted member 85 of the disc clamper 80 is attracted to the permanent magnet 46b of the turntable 46 in the state where the optical disc 3 is supported on the ring-shaped pad 46c of the turntable 46, and the optical disc 3 is held between the disc holding part 87a of the disc clamper 80 and the ring-shaped pad 46c of the turntable 46.

In this state, if an operation such as a playback operation is carried out, the spindle motor 45 is operated to rotate the turntable 46 in prescribed speeds, thereby making it possible to playback the optical disc 3 or record information thereto.

In this case, the disc pressing protrusions 88 abut on the upper surface of the optical disc 3 at the prescribed positions on the outside of the outer diameter of the turntable 46. Because of this, it is possible to stably press the upper surface of the optical disc 3 over a wider range, and effectively prevent the generation of flutter when the optical disc 3 is rotated.

In addition, since the disc clamper 80 is given a configuration described as in the above, it is possible to form the clamper 80 in light weight, and suppress its influence on the control of the rotational speed of the optical disc 3.

On the other hand, when playback is finished or when playback is stopped in order to switch to another disc, unloading operation (ejecting operation) is carried out by operating an eject button or the like. When this is done, the operation described above is carried out in a reversed order.

Finally, in the above, the disc clamper 80 and the disc drive equipped with the disc drive according to the present invention was described with reference to the embodiments shown in the drawings; however, it is to be understood that the present invention can be applied to not only CD-R drives but also other disc drives such as CD-ROM drives, CD-RW drives, DVD-drives and the like. Further, it is also to be understood that many changes and additions may be made to the embodiments described above without departing from the scope and spirit of the invention as defined in the appended claims.

What is claimed is:

1. A disc clamper which is used in a disc drive for playing back or recording and playing back a disc to be rotated by means of a turntable which is movable between a raised position and a lowered position, the disc clamper being adapted to be supported rotatably and movably in an up and down direction by a support member with an opening provided above the turntable so as to hold the disc between the disc clamper and the turntable moved to the raised position, the disc clamper comprising:

a disc clamper main body including a flange part and a cylindrical part with an upper circumference and a lower outer circumference, the flange part being provided integrally with the upper circumference of the cylindrical part so as to be supported on an upper surface of the support member, the cylindrical part having a substantially cylindrical shape wherein said lower outer circumference has a diameter almost equal to a diameter of the turntable, and the cylindrical part being adapted to be inserted into the opening in the support member;

attraction means provided in the disc clamper main body so as to be attracted to the turntable; and a plurality of disc pressing protrusions projecting outward in the radial direction from the lower outer circumference of the cylindrical part of the disc clamper main body.

2. The disc clamper as claimed in claim 1, wherein the plurality of disc pressing protrusions are composed of three protrusions formed with equal intervals in the circumferential direction.

3. The disc clamper as claimed in claim 1, wherein openings are formed in the flange part of the disc clamper main body at positions corresponding to the disc pressing protrusions so that the disc clamper is formed integrally by injection molding.

4. The disc clamper as claimed in claim 1 wherein the disc clamper main body has a bottom surface which is formed so as to have a disc holding part for holding the disc when the disc is loaded, and each of the plurality of disc pressing protrusions has a lower surface forming a common surface that continues to the surface of the disc holding part.

5. The disc clamper as claimed in claim 1 wherein the turntable has an outer circumference having said diameter, each of the plurality of disc pressing protrusions abuts on an upper surface of the disc at a position outside of the outer circumference of the turntable in a radial direction thereof when the disc is held between the turntable and the disc clamper.

6. A disc drive comprising:

a disc drive main body provided with a turntable constructed to be movable between a raised position and a lowered position for rotationally driving a disc;

a disc tray having a disc placing surface on which the disc is to be placed, the disc tray being movable between a disc play back position and a disc eject position relative to the disc drive main body;

a support member having an opening and provided above the turntable in the disc drive main body with a spacing from the turntable; and a disc clamper supported rotatably and movably in an up and down direction by the support member for holding the disc which is brought to the disc playback position by the disc tray between the turntable which has been moved to the raised position and the disc clamper;

wherein the disc clamper comprises:

a disc clamper main body including a flange part and a cylindrical part with an upper circumference and a lower outer circumference, the flange part being integrally formed on the upper circumference of the cylindrical part so as to be supported on an upper surface of the support member, the cylindrical part having a substantially cylindrical shape wherein said lower outer circumference has a diameter almost equal to a diameter of the turntable, and the cylindrical part being adapted to be inserted into the openings in the support member;

attraction means provided in the disc clamper main body so as to be attracted by the turntable, wherein a plurality of disc pressing protrusions are formed integrally on the lower outer circumference of a cylindrical part of the disc clamper at equal intervals in a circumferential direction and projecting outward in the radial direction.

7. The disc drive as claimed in claim 6 wherein the disc clamper main body has a bottom surface which is formed so as to have a disc holding part for holding the disc when the disc is loaded, and each of the plurality of disc pressing protrusions has a lower surface forming a common surface that continues to the surface of the disc holding part.

8. The disc drive as claimed in claim 6 wherein the turntable has an outer circumference having said diameter, each of the plurality of disc pressing protrusions abuts on an upper surface of the disc at a position outside of the outer circumference of the turntable in a radial direction thereof when the disc is held between the turntable and the disc clamper.

* * * * *